United States Patent
Yoshimura et al.

(10) Patent No.: US 7,412,076 B2
(45) Date of Patent: Aug. 12, 2008

(54) IMAGE PROCESSING APPARATUS, IMAGE PROCESSING METHOD, RECORDING MEDIUM, AND PROGRAM

(75) Inventors: Shinichi Yoshimura, Tokyo (JP); Teruyuki Ushiro, Chiba (JP)

(73) Assignee: Sony Corporation, Tokyo (JP)

( * ) Notice: Subject to any disclaimer, the term of this patent is extended or adjusted under 35 U.S.C. 154(b) by 790 days.

(21) Appl. No.: 10/719,938

(22) Filed: Nov. 21, 2003

(65) Prior Publication Data

US 2004/0146203 A1 Jul. 29, 2004

(30) Foreign Application Priority Data

Nov. 21, 2002 (JP) ............................. P2002-337523

(51) Int. Cl.
G06K 9/00 (2006.01)
H04N 7/18 (2006.01)
H04N 5/225 (2006.01)

(52) U.S. Cl. .................. 382/103; 348/152; 348/169

(58) Field of Classification Search ............... 382/100, 382/102–103, 105–106; 348/169–172, 152–155
See application file for complete search history.

(56) References Cited

U.S. PATENT DOCUMENTS

| | | | | |
|---|---|---|---|---|
| 5,877,804 A | * | 3/1999 | Otsuki et al. | 348/155 |
| 5,901,236 A | * | 5/1999 | Mizui | 382/104 |
| 5,937,092 A | * | 8/1999 | Wootton et al. | 382/192 |
| 6,674,893 B1 | * | 1/2004 | Abe et al. | 382/154 |
| 2003/0179083 A1 | * | 9/2003 | Wallace et al. | 340/426.1 |
| 2005/0058323 A1 | * | 3/2005 | Brodsky | 382/104 |
| 2007/0154063 A1 | * | 7/2007 | Breed | 382/100 |

FOREIGN PATENT DOCUMENTS

| | | |
|---|---|---|
| JP | 7-129781 | 5/1995 |
| JP | 10-232985 | 9/1998 |
| JP | 11-225326 | 8/1999 |

* cited by examiner

*Primary Examiner*—Samir A. Ahmed
*Assistant Examiner*—Nathan Bloom
(74) *Attorney, Agent, or Firm*—Bell, Boyd & Lloyd LLP

(57) ABSTRACT

A floodlight section emits light with a predetermined blinking pattern. The emitted light is reflected by a reflecting object. An image capturing section captures the light reflected by the reflecting object. A surveillance apparatus compares the pattern of the reflected light captured by the image capturing section and the blinking pattern of the light emitted by the floodlight section to determine that there is no invader in a surveillance area between the surveillance apparatus and the reflecting object while the predetermined blinking pattern is detected, and that there is an invader in the surveillance area when the predetermined blinking pattern is not detected. The present invention can be applied to surveillance apparatuses.

8 Claims, 22 Drawing Sheets

IMAGE PROCESSING APPARATUS, IMAGE PROCESSING METHOD, RECORDING MEDIUM, AND PROGRAM

BACKGROUND OF THE INVENTION

The present invention relates, generally, to image processing apparatuses, image processing methods, recording media and programs, and more particularly, to an image processing apparatus, an image processing method, a recording medium, and a program capable of monitoring a surveillance area in a stable manner.

Security systems (surveillance apparatuses) for determining whether an invader has entered a predetermined area have been increasingly used.

As conventional security systems or invasion detection apparatuses, a combination of an image capturing apparatus and an image processing apparatus, or a detection apparatus which detects the temperature of a human body by using a pyroelectric sensor or the like, has been proposed.

Alternatively, as disclosed in Japanese Unexamined Patent Application Publication No. Hei-10-232985, for example, an apparatus has been proposed which projects spots divided into a two-dimensional grid pattern, and captures a projection image at a predetermined cycle to monitor the position and posture of a person from a change in the coordinates of each spot.

Further, as disclosed in Japanese Unexamined Patent Application Publication No. Hei-11-225326, for example, an apparatus has been proposed which emits an optical pattern to obtain a range image, detects the motion of an object and records a two-dimensional image obtained when the motion is detected, in a predetermined recording medium.

Furthermore, as disclosed in Japanese Unexamined Patent Application Publication No. Hei-7-129781, for example, an apparatus has been proposed which is provided with a sensing system that extracts change information from continuous motion images in a non-contact and remote manner without using a special illumination and light-emitting apparatus, and drives a subsequent processing system, if necessary.

When an image capturing apparatus and an image processing apparatus are combined, they specifically operate in the following way. As shown in FIG. 1, a surveillance area 2, which includes an object 1 under surveillance, is specified. The image capturing apparatus stores the brightness of the surveillance area 2 which is in a normal state (has no invading object), and has it as a reference image. The image processing apparatus successively captures images to detect a change in the brightness of the surveillance area 2, compares them with the reference image, detects, for example, a large difference in brightness caused by the shadow 11a of an invading object 11, as shown in FIG. 2, and determines that something has occurred (the invading object has been detected).

In this method, however, if the surrounding brightness is changed during image capturing, it can be assumed that the brightness of the surveillance area 2 is changed from that obtained before, and the reference image cannot be used as a reference any more.

When the brightness is changed in time by the flicker of a fluorescent light 3 as shown in FIG. 3, for example, if the shadow 11a is generated by the invading object 11 at a moment when the brightness is increased, a reduction in brightness caused by the shadow 11a is not as large as expected, and it may be not determined that something has occurred.

When an incandescent lamp 4 disposed close to the surveillance area 2 is turned on as shown in FIG. 4, the brightness of the surveillance area 2 is increased. If the shadow 11a is generated by the invading object 11, a reduction in brightness caused by the shadow 11a is not as large as expected, and it may be not determined that something has occurred.

To prevent these erroneous operations, when it is determined that the brightness of the entire system has been changed, it is necessary to store the reference image again, which is troublesome work.

When a charge-coupled-device (CCD) camera is used, for example, since image capturing is performed at an interval of 30 Hz (that is, it takes 33 ms to capture a one-frame image), if the invading object 11 moves fast across the surveillance area 2, the shadow 11a of the invading object 11 cannot be detected.

Further, when an apparatus provided with a pyroelectric sensor is used, since it responds to any objects emitting heat, including small animals such as dogs and cats in addition to persons, erroneous operations frequently occur.

There is also another method in which an infrared light source and a sensor for receiving infrared light are installed at an invasion path, and invasion is detected when the invading object 11 blocks off the light emitted from the light source to the sensor. To detect invasion at a wide area, it is necessary to install a great number of such apparatuses, which increases the cost and the size of the system.

SUMMARY OF THE INVENTION

The present invention has been developed in consideration of the above-described conditions. Accordingly, it is an object of the present invention to provide a technology with which an invading object is detected in a stable manner even if the surrounding brightness is changed, and with which a wide area can be monitored collectively at a high speed.

The foregoing object is achieved in one embodiment of the present invention through the provision of an image processing apparatus including a reflector for reflecting emitted light changing with a predetermined pattern, an image capturing device for capturing an image of the reflected light reflected by the reflector, a difference calculator for obtaining the difference, among 2N consecutive frames, between the sum in the recent N frames and the sum in the other N frames for each pixel of the image of the reflected light, captured by the image capturing device, a comparator for comparing the result of calculation performed by the difference calculator, with a predetermined threshold, a signal processor for outputting a first signal or a second signal according to the result of comparison performed by the comparator, a determination device for determining at a predetermined interval whether the signal output from the signal processor is a predetermined signal, and a detector for detecting an invader according to the result of determination performed by the determination device.

The image processing apparatus may further include a floodlight for emitting the emitted light changing with the predetermined pattern.

In the image processing apparatus, N may be set to two.

The period of the emitted light changing with the predetermined pattern may be equal to the period of time of three frames in the image capturing device.

The determination device may determine at an interval of six frames whether the signal output from the signal processor is a high-level signal.

The determination device may change the interval at which the determination device determines whether the signal output from the signal processor is a high-level signal to any of five frames, six frames, and seven frames.

The foregoing object is achieved in another embodiment of the present invention through the provision of an image processing method including a reflection step of reflecting emitted light changing with a predetermined pattern, an image capturing step of capturing an image of the reflected light reflected by the process of the reflection step, a difference calculation step of obtaining the difference, among 2N consecutive frames, between the sum in the recent N frames and the sum in the other N frames for each pixel of the image of the reflected light, captured by the process of the image capturing step, a comparison step of comparing the result of calculation performed by the process of the difference calculation step, with a predetermined threshold, a signal processing step of outputting a first signal or a second signal according to the result of comparison performed in the comparison step, a determination step of determining at a predetermined interval whether the signal output by the process of the signal processing step is a predetermined signal, and a detection step of detecting an invader according to the result of determination performed by the process of the determination step.

The foregoing object is achieved in yet another embodiment of the present invention through the provision of a recording medium having recorded therein a computer readable program, the program including a difference calculation step of obtaining the difference, among 2N consecutive frames, between the sum in the recent N frames and the sum in the other N frames for each pixel of a captured image of reflected light, a comparison step of comparing the result of calculation performed by the process of the difference calculation step, with a predetermined threshold, a signal processing step of outputting a first signal or a second signal according to the result of comparison performed in the comparison step, a determination step of determining at a predetermined interval whether the signal output by the process of the signal processing step is a predetermined signal, and a detection step of detecting an invader according to the result of determination performed by the process of the determination step.

The foregoing object is achieved in still another embodiment of the present invention through the provision of a program for making a computer execute processing, the processing including a difference calculation step of obtaining the difference, among 2N consecutive frames, between the sum in the recent N frames and the sum in the other N frames for each pixel of a captured image of reflected light, a comparison step of comparing the result of calculation performed by the process of the difference calculation step, with a predetermined threshold, a signal processing step of outputting a first signal or a second signal according to the result of comparison performed in the comparison step, a determination step of determining at a predetermined interval whether the signal output by the process of the signal processing step is a predetermined signal, and a detection step of detecting an invader according to the result of determination performed by the process of the determination step.

In an image processing apparatus, an image processing method, and a program according to the present invention, emitted light changing with a predetermined pattern is reflected, an image of the reflected light is captured, the difference, among 2N consecutive frames, between the sum in the recent N frames and the sum in the other N frames for each pixel of the image of the reflected light is obtained, the result of calculation is compared with a predetermined threshold, a first signal or a second signal is output according to the result of comparison, whether the output signal is a predetermined signal is determined at a predetermined interval, and an invader is detected according to the result of determination.

According to the present invention, it is not necessary to update the reference image according to a change in brightness, and an erroneous operation caused by a change in brightness is prevented. Therefore, a surveillance area can be extended.

Additional features and advantages of the present invention are described in, and will be apparent from, the following Detailed Description of the Invention and the Figures.

DETAILED DESCRIPTION OF THE INVENTION

Figure 1:
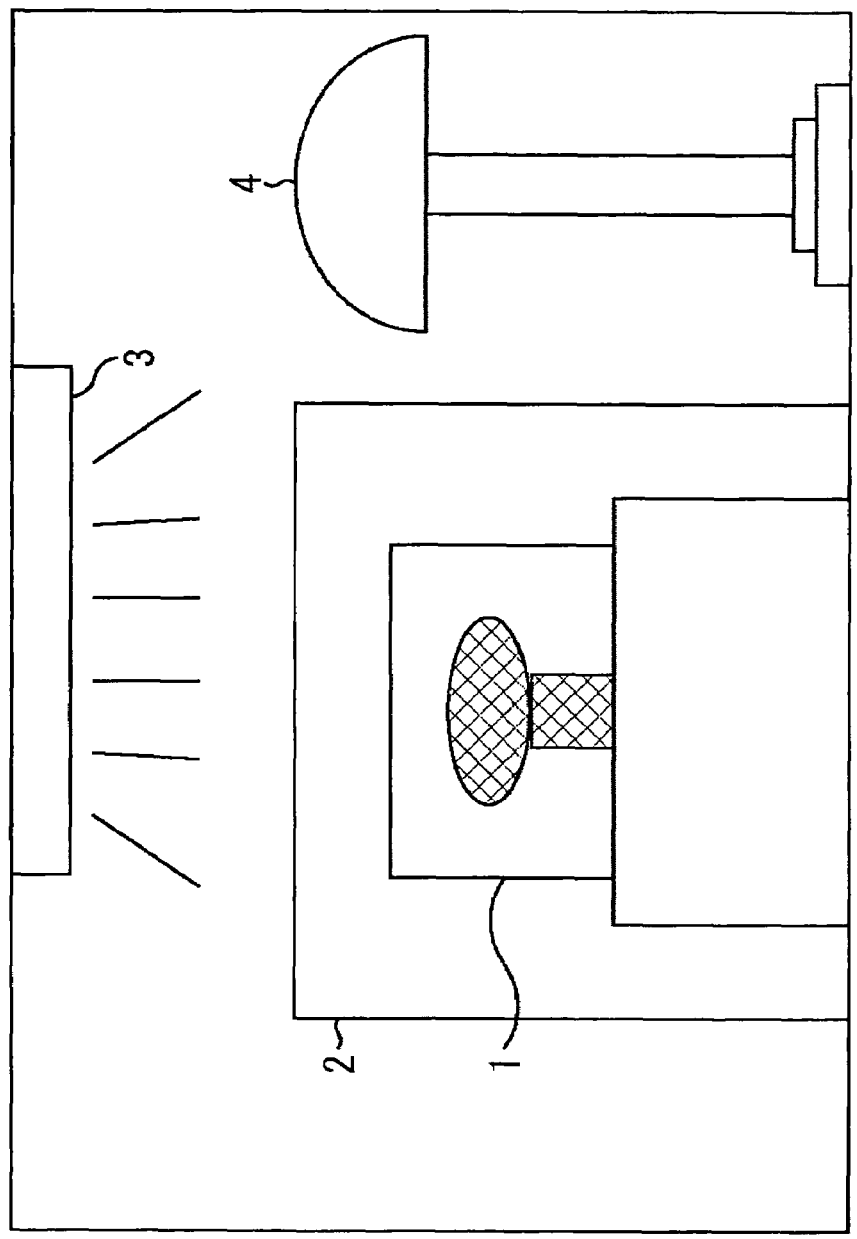
FIG. 1 is a view showing conventional surveillance processing.
Figure 2:
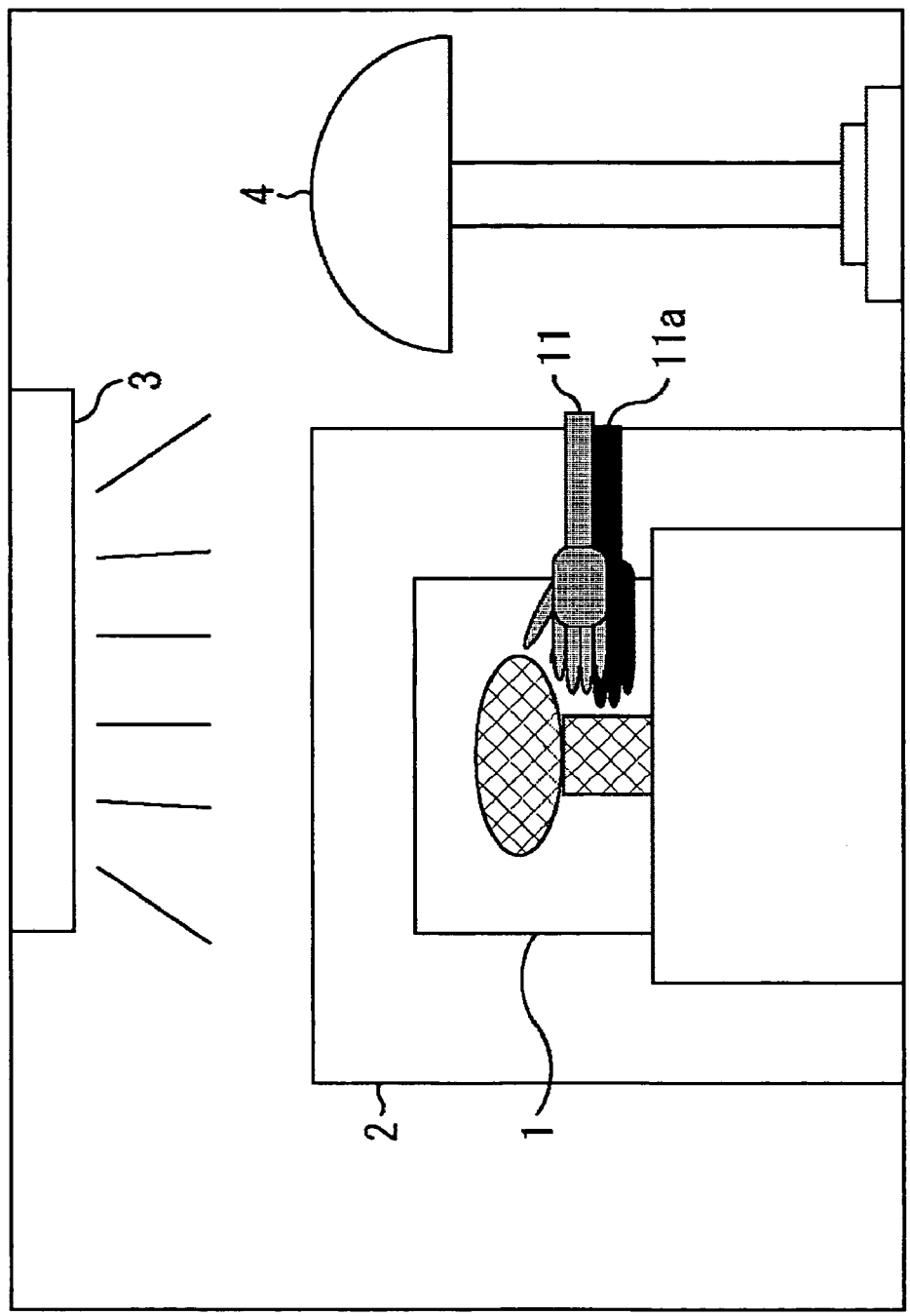
FIG. 2 is a further view showing the conventional surveillance processing.
Figure 3:
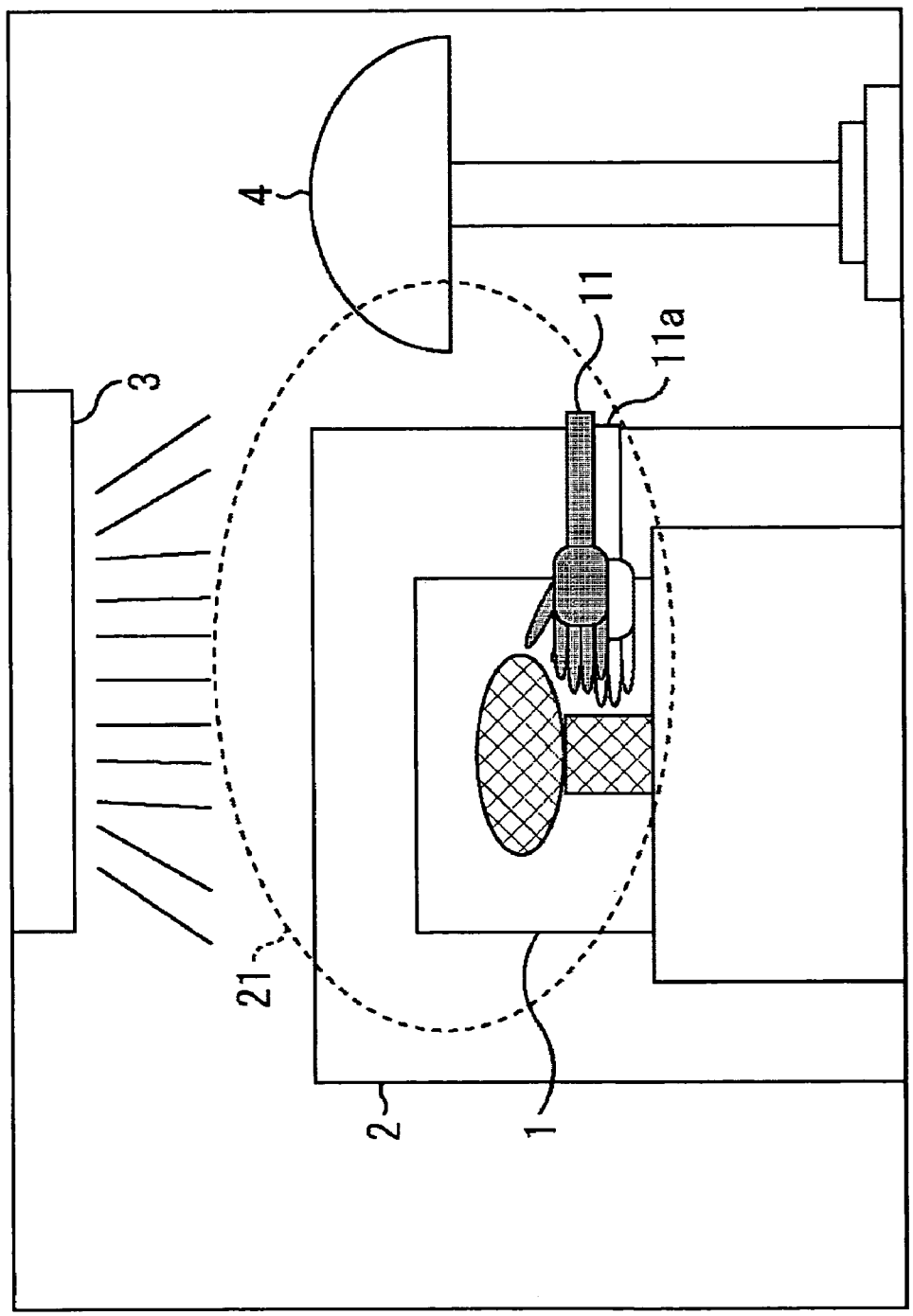
FIG. 3 is a further view showing the conventional surveillance processing.
Figure 4:
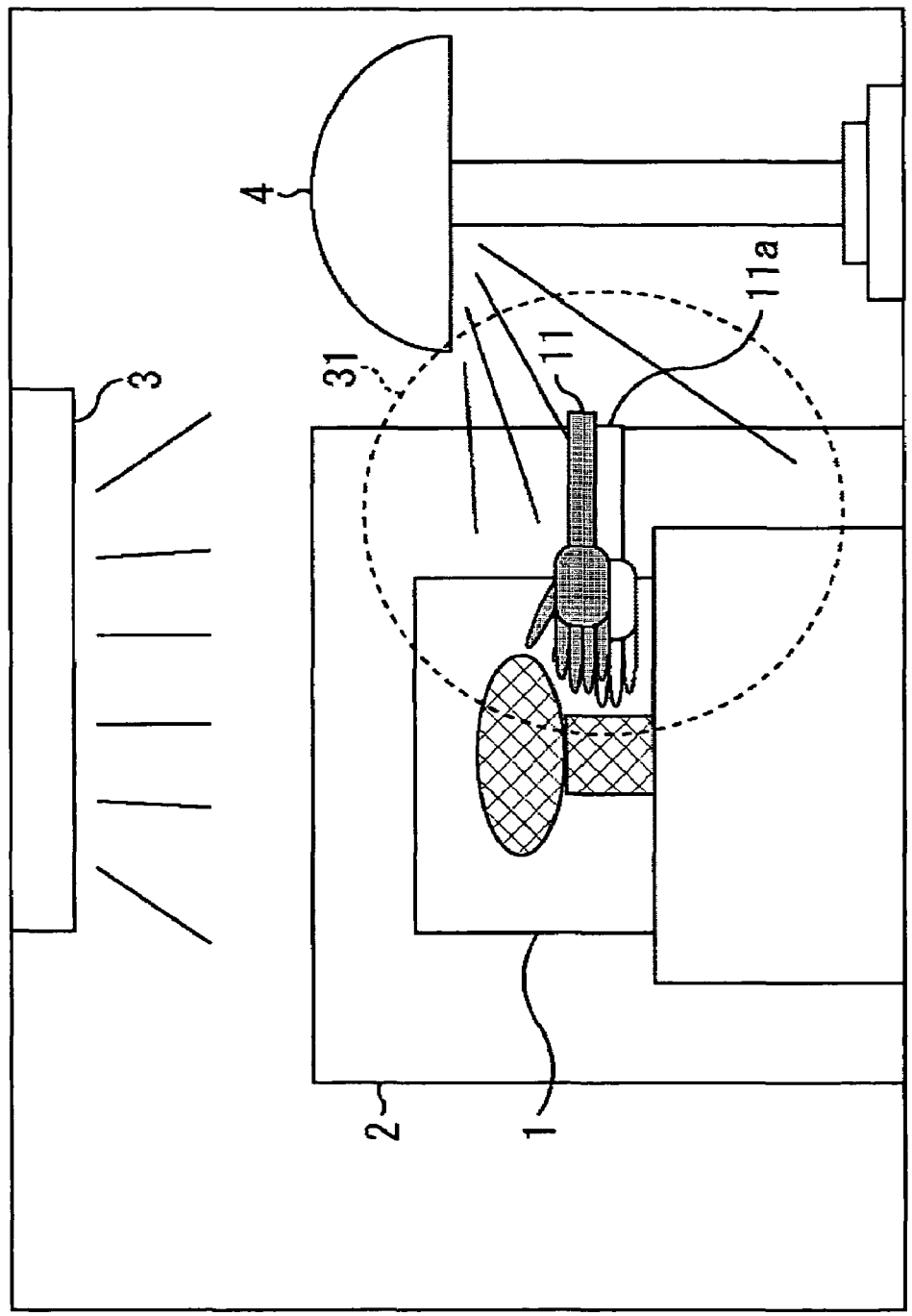
FIG. 4 is a further view showing the conventional surveillance processing.
Figure 5:
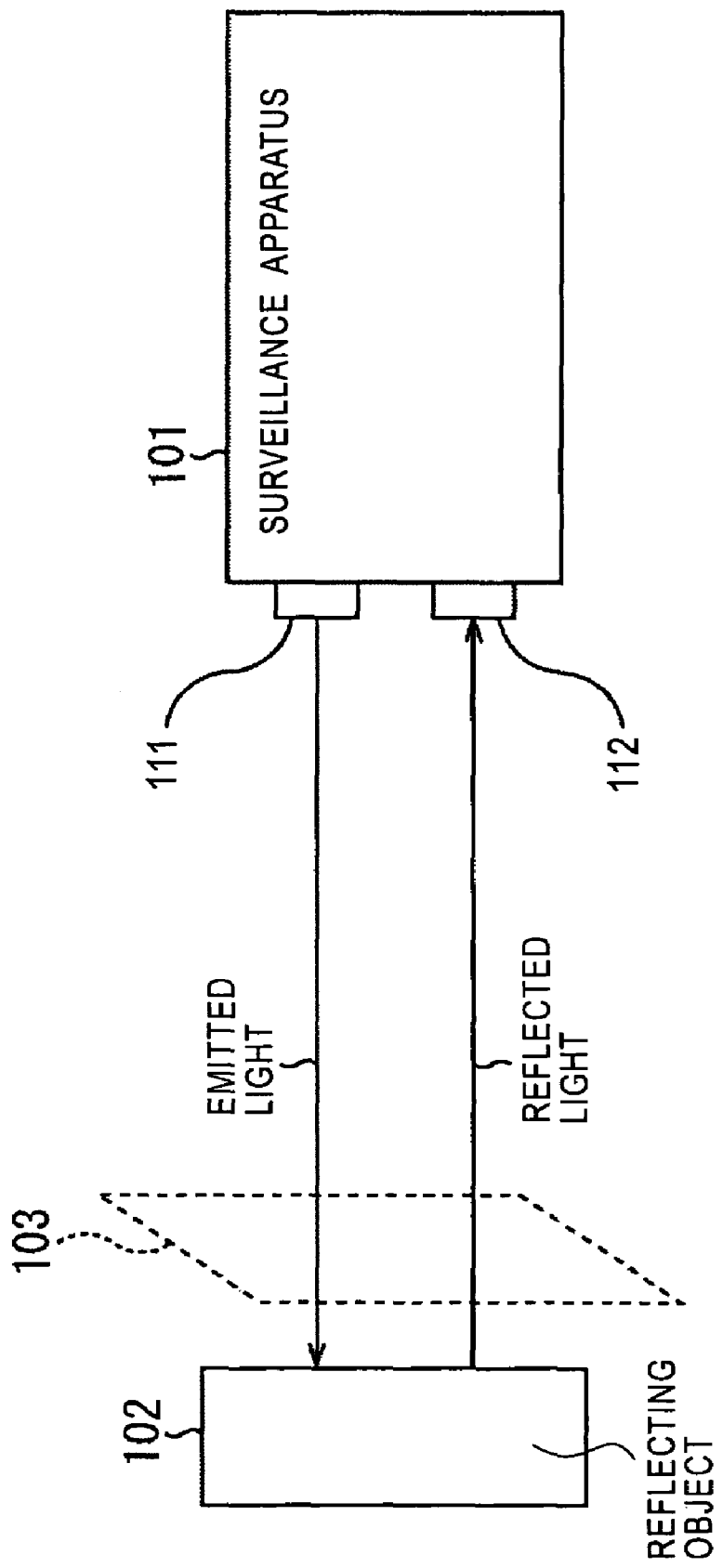
FIG. 5 is a view showing the structure of a surveillance system according to an embodiment of the present invention.

FIG. 5 is a view showing the structure of a surveillance apparatus 101 according to one embodiment of the present invention.

The surveillance apparatus 101 has a floodlight section 111 and an image capturing section 112. The floodlight section 111 projects blinking light having a predetermined frequency, the emitted light passes through a surveillance area 103, and a reflecting object 102 reflects the light. The image capturing section 112 captures the reflected light, detects a change in the light having the predetermined frequency, and determines from the change whether an invader has invaded the surveillance area 103 between the surveillance apparatus 101 and the reflecting object 102.

Figure 6:
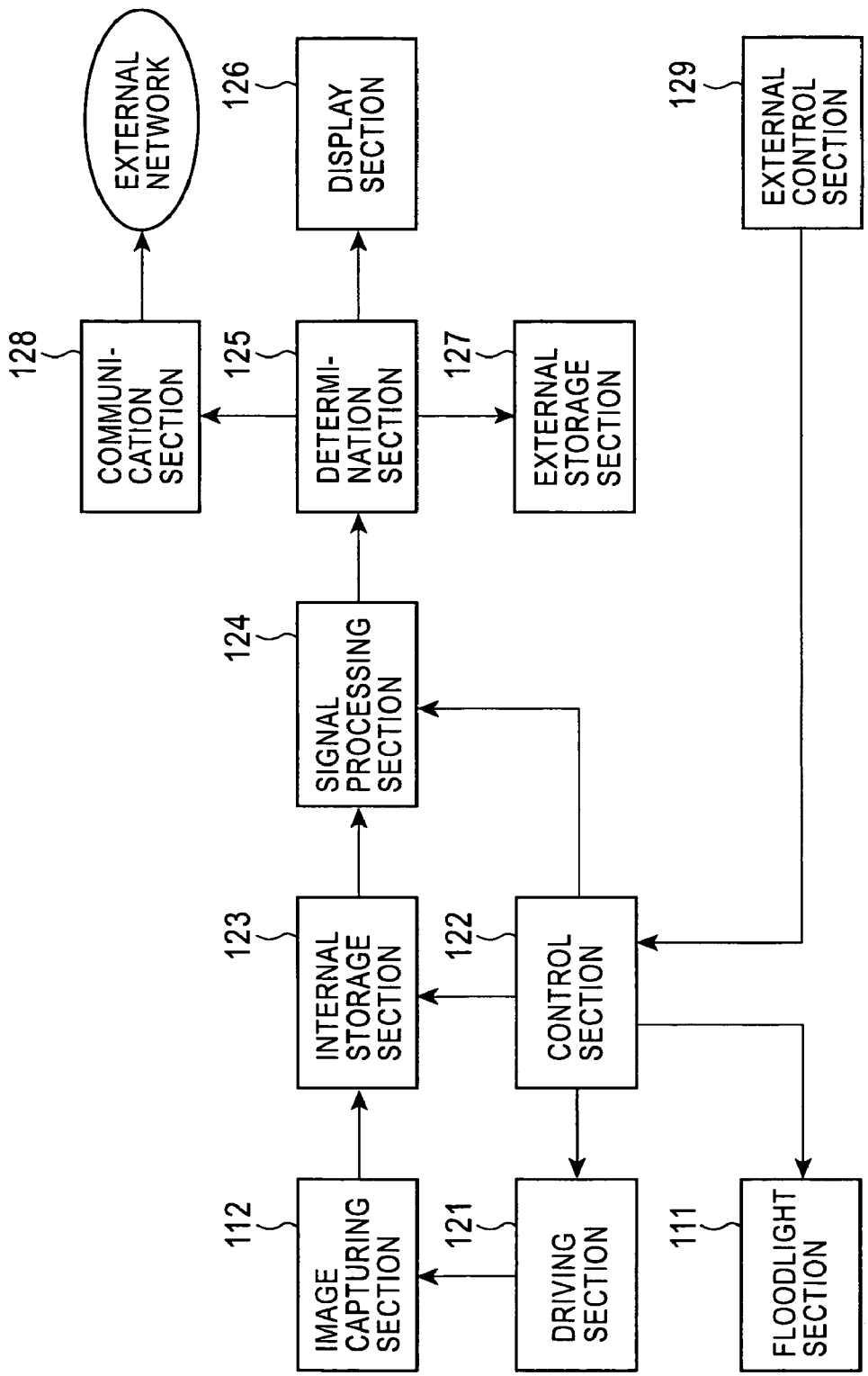
FIG. 6 is a block diagram showing the structure of a surveillance apparatus shown in FIG. 5.

FIG. 6 shows the structure of the surveillance apparatus 101 according to the embodiment of FIG. 5.

The floodlight section 111 projects light which changes (blinks) at a regular pattern onto the surveillance area 103 shown in FIG. 5 (that is, at the predetermined frequency toward the reflecting object 102), and is, for example, formed of a solid light-emitting element, such as a light-emitting diode (LED) or a semiconductor laser. The floodlight section 111 is controlled by a control section 122, and may use light not only in the visible-light region (having a wavelength range of 400 nm to 700 nm) but also in the infrared region (having a wavelength range of longer than 700 nm) or in the ultra-violet region (having a wavelength range of shorter than 400 nm). When light outside the visible-light region is used, surveillance can be achieved while an invader cannot see the light.

The image capturing section 112 has a CCD camera or a complementary-metal-oxide-semiconductor (CMOS) camera which can capture images at a high frame rate according to a synchronization signal and driving signals such as clock pulses generated by a driving section 121, captures an image in the surveillance area 103, and outputs the image to an internal storage section 123 disposed at a subsequent stage.

The control section 122 sends a driving control signal, an internal-storage control signal, a floodlight control signal, and a signal-processing control signal to the driving section 121, the internal storage section 123, the floodlight section 111, and a signal processing section 124, respectively, to control operation timing.

The internal storage section 123 is formed of general dynamic-random-access memories (DRAMs) and static-random-access memories (SRAMs), and temporarily stores the images captured by the image capturing section 112 along the time axis. The storage capacity of the internal storage section 123 is determined by the number of pixels in the image capturing section 112, and the number of signals stored for each pixel; that is, the number of color tones and the number of frames. When the image capturing section 112 has a high-speed image-capturing CCD image sensor having 640 pixels by 480 pixels, for example, if eight-bit signals for four frames consecutive in time are stored for each pixel, a storage capacity of 640×480×4×8=9,600 Kbits (1,200 Kbytes) is required. Signals stored in the internal storage section 123 are read by the signal processing section 124 as stored signals at timing specified by the control section 122.

The signal processing section 124 processes stored signals read from the internal storage section 123 and sends the result of signal processing to a determination section 125. The signal processing section 124, for example, uses signals for four frames consecutive in time as stored signals to calculate an inter-four-frame difference F(N) for each pixel according to the following expression (1).

$$F(N) = \{f(N) + f(N-1)\} - \{f(N-2) + f(N-3)\} \quad (1)$$

where, N indicates the number of a frame, N−1 indicates the number of the frame immediately before the frame having the number N, N−2 indicates the number of the frame two frames before the frame having the number N, and N−3 indicates the number of the frame three frames before the frame having the number N. The values of the signals for the frames are indicated by f(N), f(N−1), f(N−2), and f(N−3).

The sign of the signal-processing result, the calculation result of expression (1), is inverted immediately after the brightness of each pixel is changed. The signal processing section 124 outputs a high signal when the calculation result of expression (1) is a negative value (excluding zero), and a low signal when the calculation result is a positive value (including zero). The calculation of expression (1) will be described later in detail.

The determination section 125 determines the signal-processing result sent from the signal processing section 124, according to a predetermined rule by using a built-in counter, and, as results of determination, outputs determination-result display data to a display section 126, determination-result storage data to an external storage section 127, and determination-result communication data to a communication section 128.

The display section 126 is formed of a cathode ray tube (CRT) or a liquid-crystal display (LCD), and displays the determination-result display data input from the determination section 125. The determination-result display data may include information useful to understand the situation when being referred to later, such as the time when the determination was made and the signal-processing result itself, in addition to the determination result.

The external storage section 127 temporarily stores the determination-result storage data input from the determination section 125. The determination-result storage data may include information useful to understand the situation when being referred to later, such as the time when the determination was made and the signal-processing result itself, in addition to the determination result.

The communication section 128 converts the determination-result communication data to a signal suited to an external network, such as the Internet, and outputs it as communication data.

The determination-result communication data may include information useful to understand the situation when being referred to later, such as the time when the determination was made and the signal-processing result itself, in addition to the determination result.

An external control section 129 outputs an external control signal to the control section 122 to externally control the operation timing and operation pattern of the image capturing section 112 and the floodlight section 111.

The signal processing performed by the signal processing section 124 will be described next.

Figure 7:
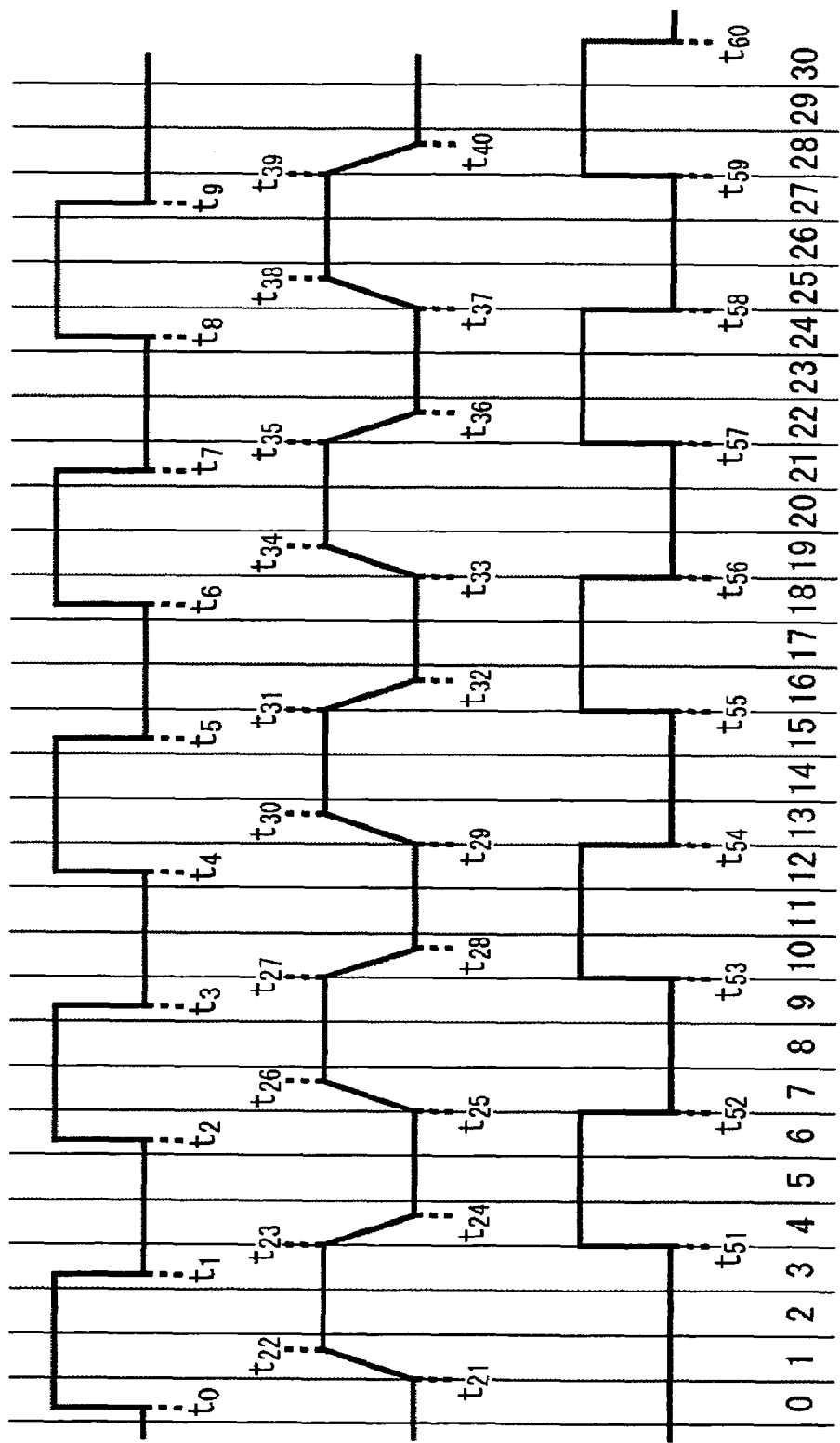
FIG. 7 is a view showing surveillance processing performed by the surveillance apparatus shown in FIG. 6.

The top row of FIG. 7 shows the pattern of an optical signal emitted from the floodlight section 111, the middle row of FIG. 7 shows the pattern obtained when the image capturing section 112 captures the reflected light acquired when the optical signal emitted by the floodlight section 111 is reflected by the reflecting object 102, and the bottom row of FIG. 7 shows the pattern of a signal which has been signal-processed according to the pattern of the reflected light. Numbers 0 to 30 written at the bottom of FIG. 7 indicate frame numbers. Therefore, the interval of vertical lines corresponds to the period of one frame.

As shown in the top row of FIG. 7, the floodlight section 111 continues to project light with its binary brightness level being switched at an interval of three frames, according to an instruction from the control section 122. More specifically, at the top row of FIG. 7, the optical signal is switched to the high level at time t0, t2, t4, t6, and t8, and is switched to the low level at time t1, t3, t5, t7, and t9. Corresponding to this signal, an optical signal formed of the reflected light reflected by the reflecting object 102 increases its level gradually when the image capturing section 112 captures the reflected light, at time t21, t25, t29, t33, and t37 with a slight delay due to an optical path difference, and is switched to the high level at time t22, t26, t30, t34, and t38. The optical signal reduces its level at time t23, t27, t31, t35, and t39, and is switched completely to the low level at time t24, t28, t32, t36, and t40. The optical signal is changed in this manner repeatedly.

Since the image capturing section 112 continues to output the results of capturing to the internal storage section 123 during the period of time shown in FIG. 7, the internal storage section 123 always stores the values of each pixel for four frames as the results of capturing. According to the values of the pattern (at the middle row of FIG. 7) of the reflected light captured by the image capturing section 112, the signal processing section 124 calculates the inter-four-frame difference according to expression (1) by using the values of each pixel for the frame f(N−3) three frame before the current frame f(N) to the current frame f(N). At time t51, for example, since the frame number is four, the following expression (2) is calculated based on expression (1).

$$F(4) = \{f(4) + f(3)\} - \{f(2) + f(1)\} \quad (2)$$

In this case, as shown at the middle row of FIG. 7, since f(2) and f(3) are both high, they are offset. Since f(4) is smaller than f(1) (f(4) has a smaller high-level area), F(4)<0. As a result, the signal processing section 124 outputs a high-level signal as shown at the bottom row of FIG. 7. In the same way, when the frame number is five, the following expression (3) is calculated.

$$F(5) = \{f(5) + f(4)\} - \{f(3) + f(2)\} \quad (3)$$

In this case, since f(5) is low, and both f(2) and f(3) are high, F(5)<0. The signal processing section 124 outputs a high-level signal. In the same way, since F(6)<0, the signal processing section 124 outputs a high-level signal.

Since f(5) and f(6) are both low, they are offset. Since f(7) is larger than f(4), F(7) is positive. As a result, the signal processing section 124 outputs a low-level signal. In the same way, since F(8) and F(9) are both positive, the signal processing section 124 outputs a low-level signal.

As a result, at the bottom row of FIG. 7, the signal has the low level from F(1) to F(3), from F(7) to F(9), from F(13) to F(15), from F(19) to F(21), and from F(25) to F(27), and the signal has the high level from F(4) to F(6), from F(10) to F(12), from F(16) to F(18), from F(22) to F(24), and from F(28) to F(30). In other words, the signal switched between the high and low levels at an interval of three frames is output.

Therefore, when the signal processing section 124 outputs the signal as shown at the bottom row of FIG. 7, there is no invader (including an invading object) which blocks off the emitted light or the reflected light between the surveillance apparatus 101 and the reflecting object 102.

Figure 8:
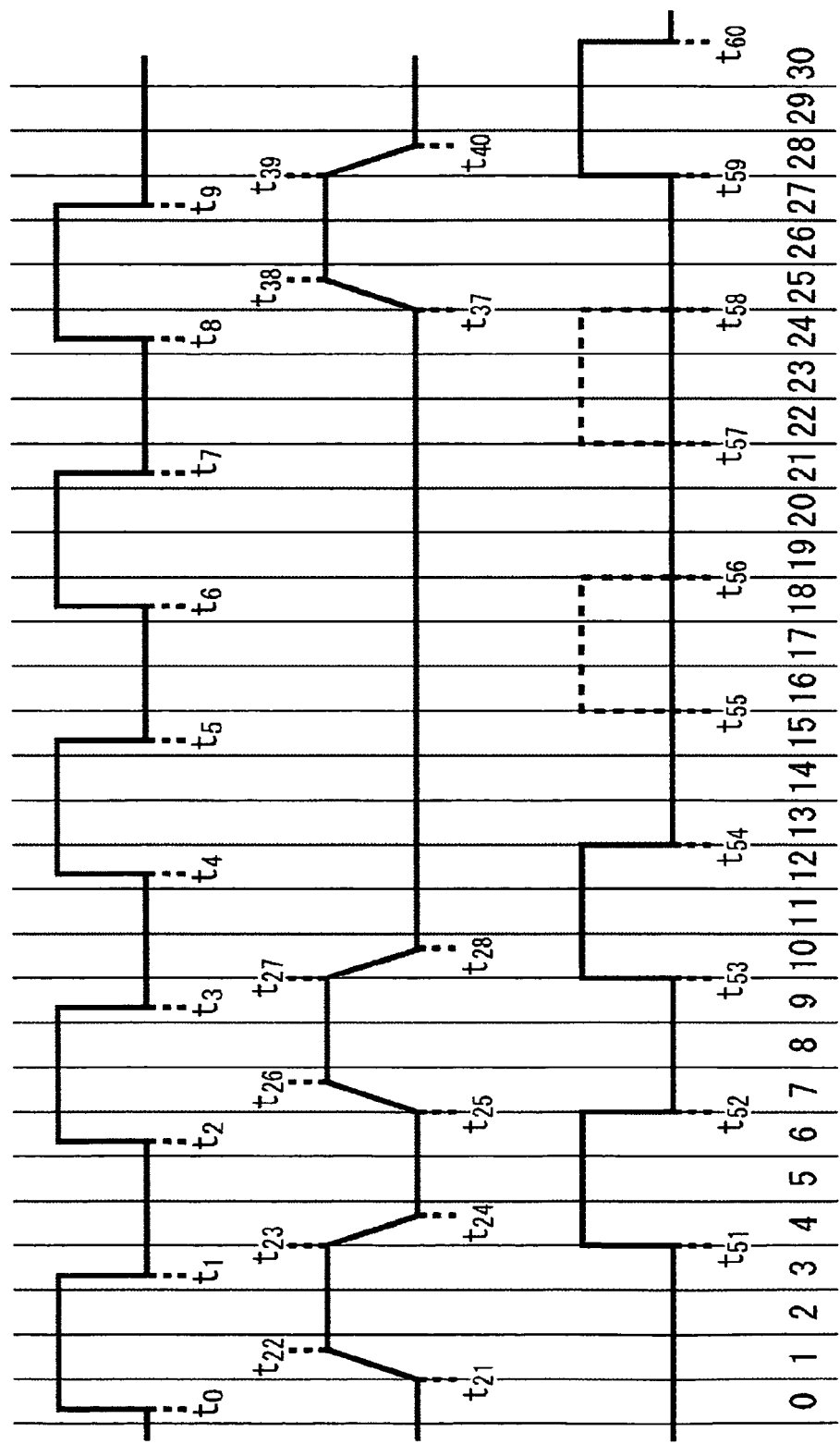
FIG. 8 is a further view showing the surveillance processing performed by the surveillance apparatus shown in FIG. 6.

When an invader (including an invading object) which blocks off the emitted light or the reflected light between the surveillance apparatus 101 and the reflecting object 102 passes through, the signal has a waveform as shown in FIG. 8.

More specifically, as shown at the top row of FIG. 8, the floodlight section 111 outputs an optical signal. When an invader passes through between time t28 and time t37 in FIG. 8, the result of capturing by the image capturing section 112 has a waveform as shown at the middle row of FIG. 8, and the signal processing section 124 outputs a signal having a waveform as shown at the bottom row of FIG. 8, accordingly.

Between time t28 and time t37, the floodlight section 111 projects light. Since the reflected light (or the emitted light) is blocked off by the invader, the image capturing section 112 cannot capture the reflected light and, as a result, the result of capturing has a changed waveform (waveform which is not switched between the high and low levels at a constant interval). Accordingly, since the inter-four-frame difference F becomes zero during that period, the signal processing section 124 outputs a low-level signal. As a result, the determination section 125 does not receive a high-level output from frame number 16 to frame number 18 or from frame number 22 to frame number 24, which should be detected if nothing occurs between the surveillance apparatus 101 and the reflecting object 102. The determination section 125 can detect the invader from such a change in waveform.

Figure 9:
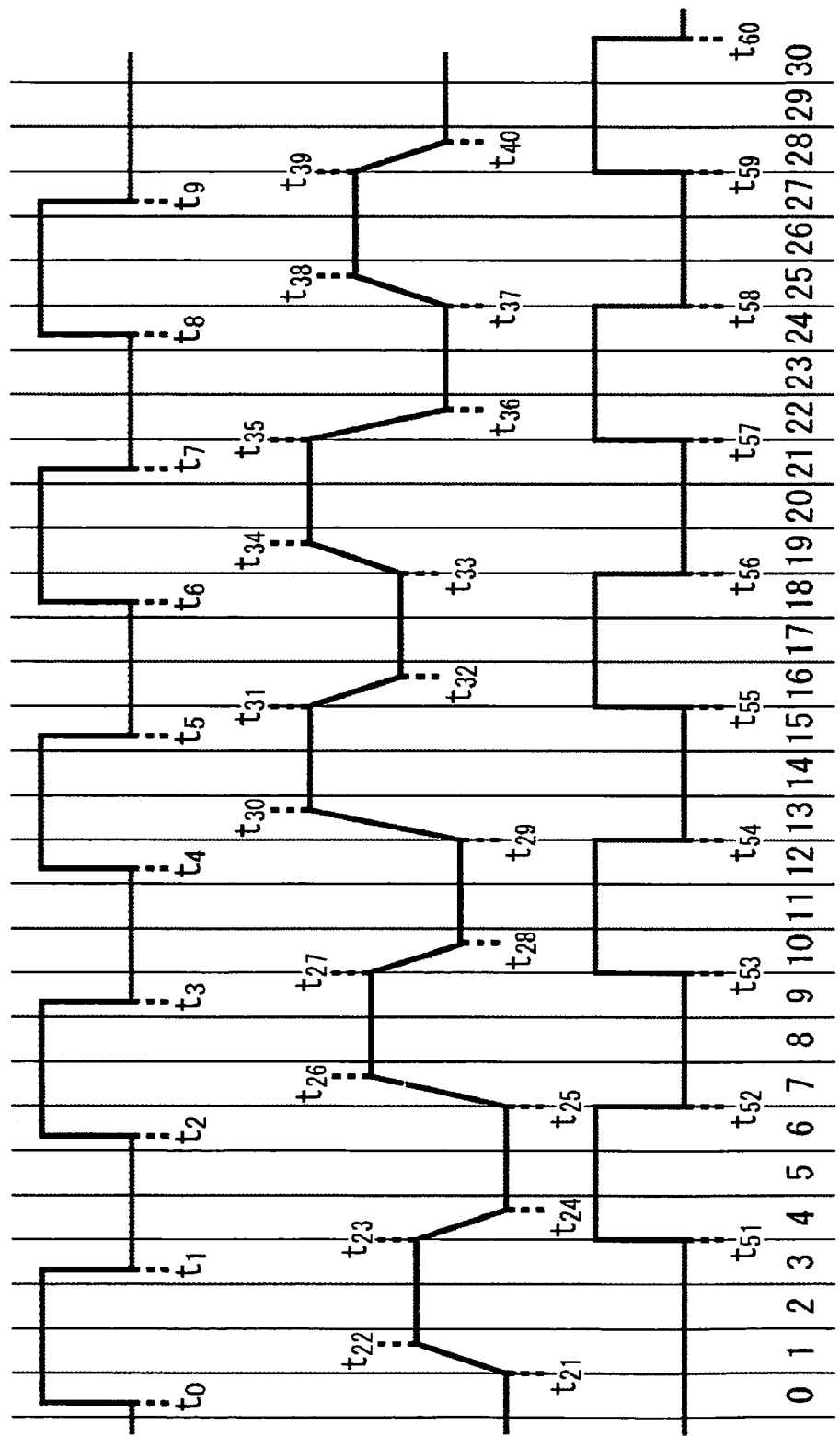
FIG. 9 is a further view showing the surveillance processing performed by the surveillance apparatus shown in FIG. 6.

When the surrounding brightness is changed between the surveillance apparatus 101 and the reflecting object 102 at the above-described structure, even if the floodlight section 111 emits light constantly as shown in the top row of FIG. 9, the value of each pixel captured by the image capturing section 112 is changed in response to a change in brightness. Since the inter-four-frame difference F calculated by expression (1) indicates a change in the value of each pixel in a total of four frames from the frame three frames before the current frame to the current frame, however, the result of processing performed by the signal processing section 124 is not changed. Therefore, when illumination, for example, is provided which causes a change in brightness around the surveillance apparatus 101 and the reflecting object 102, for example, or when brightness is changed due to weather or time outdoors, it is possible to correctly detect an invader.

Figure 10:
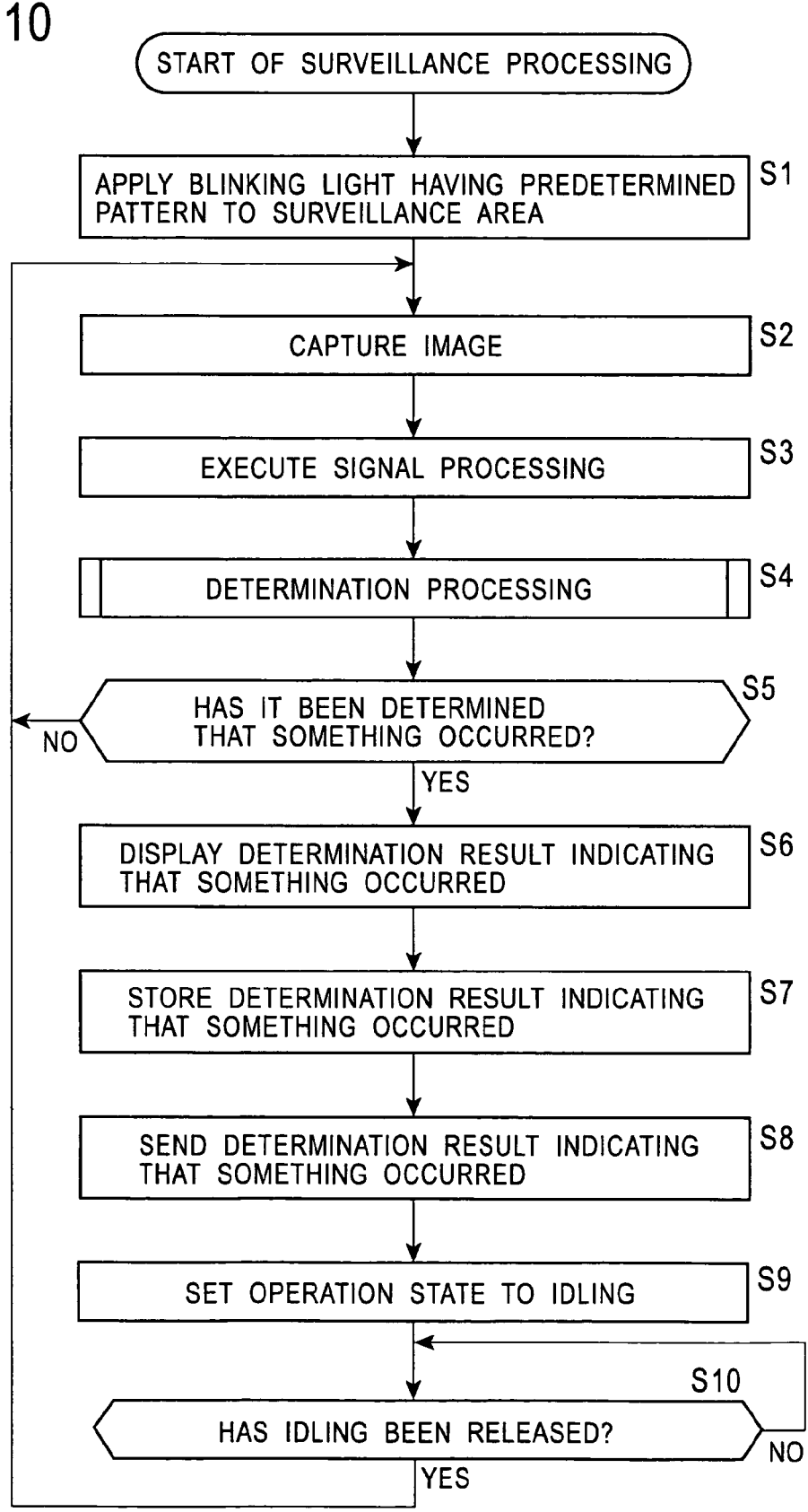
FIG. 10 is a flowchart showing the surveillance processing performed by the surveillance apparatus shown in FIG. 6.

Surveillance processing will be described next by referring to the flowchart shown in FIG. 10.

In step S1, the control section 122 controls the floodlight section 111 to project (emit) blinking light having a predetermined pattern toward the surroundings of the surveillance area 103. It is assumed here that the period of the predetermined pattern corresponds to three frames in the image capturing section 112.

In step S2, the control section 122 controls the driving section 121 such that the image capturing section 112 captures an image of the surveillance area 103. More specifically, the image capturing section 112 captures the light reflected from the reflecting object 102 disposed at a far end against the surveillance area 103, viewed from the surveillance apparatus 101, and outputs the results of capturing to the internal storage section 123 to sequentially store the results of capturing.

In step S3, the control section 122 controls the signal processing section 124 such that the internal storage section 123 reads, among image signals stored therein, signals for the four frames close to the current time, obtains the inter-four-frame difference by calculation processing according to expression (1), and outputs the difference to the determination section 125.

In step S4, the determination section 125 executes determination processing according to the inter-four-frame difference F input from the signal processing section 124.

Figure 11:
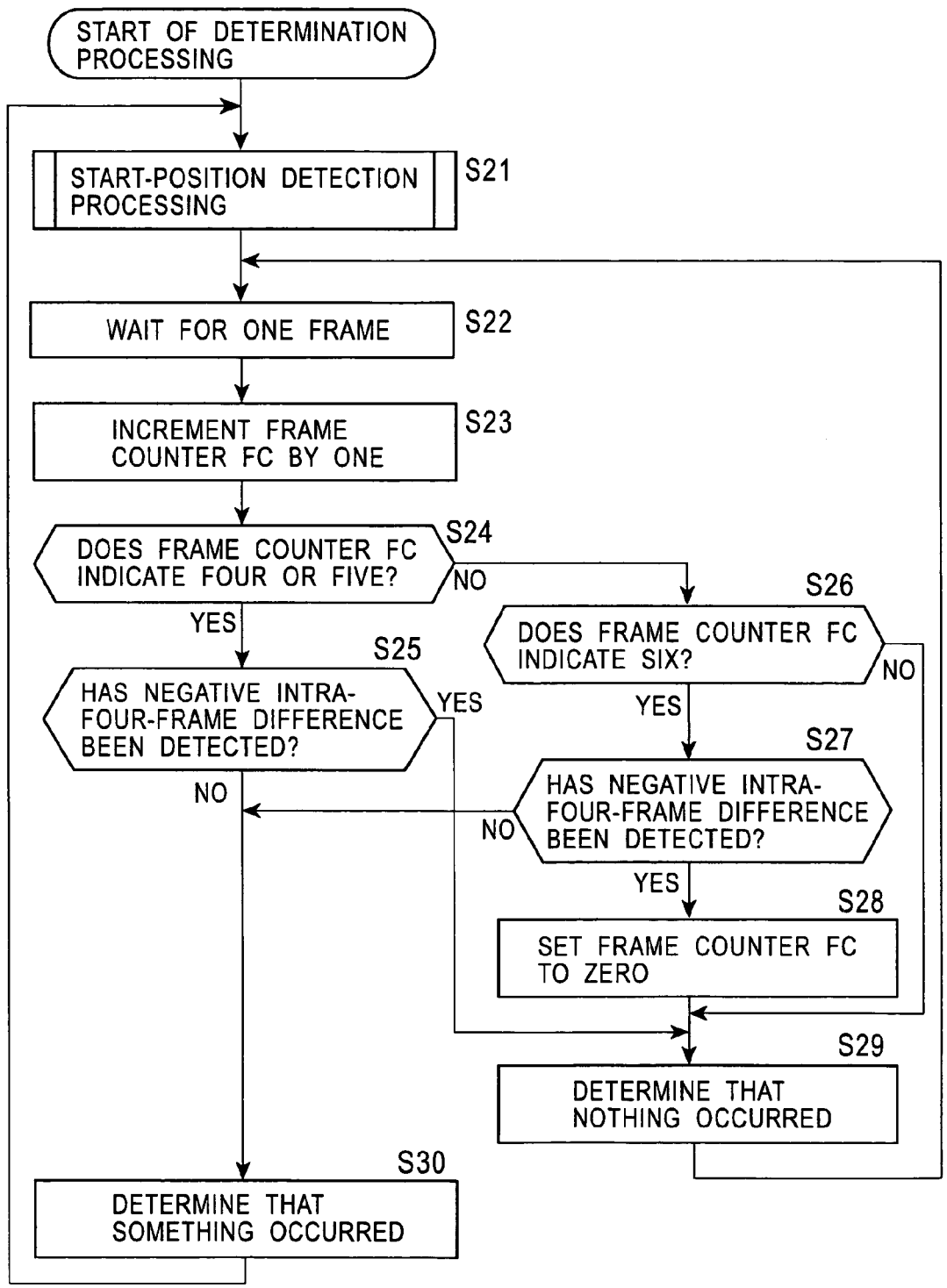
FIG. 11 is a flowchart showing determination processing performed by a determination section shown in FIG. 6.

The determination processing performed by the determination section 125 will be described below by referring to the flowchart shown in FIG. 11.

In step S21, the determination section 125 executes start-position detection processing.

Figure 12:
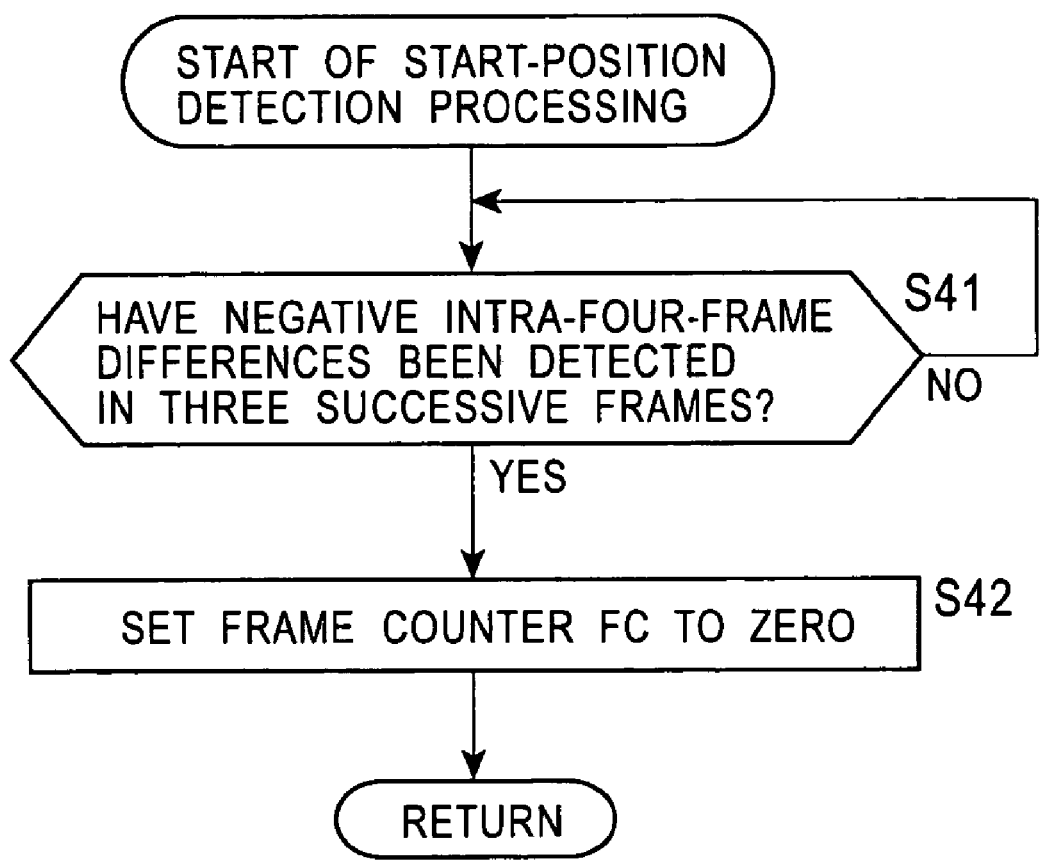
FIG. 12 is a flowchart showing start-position detection processing performed by the determination section shown in FIG. 6.

The start-position detection processing will be described below by referring to the flowchart shown in FIG. 12.

Figure 13:
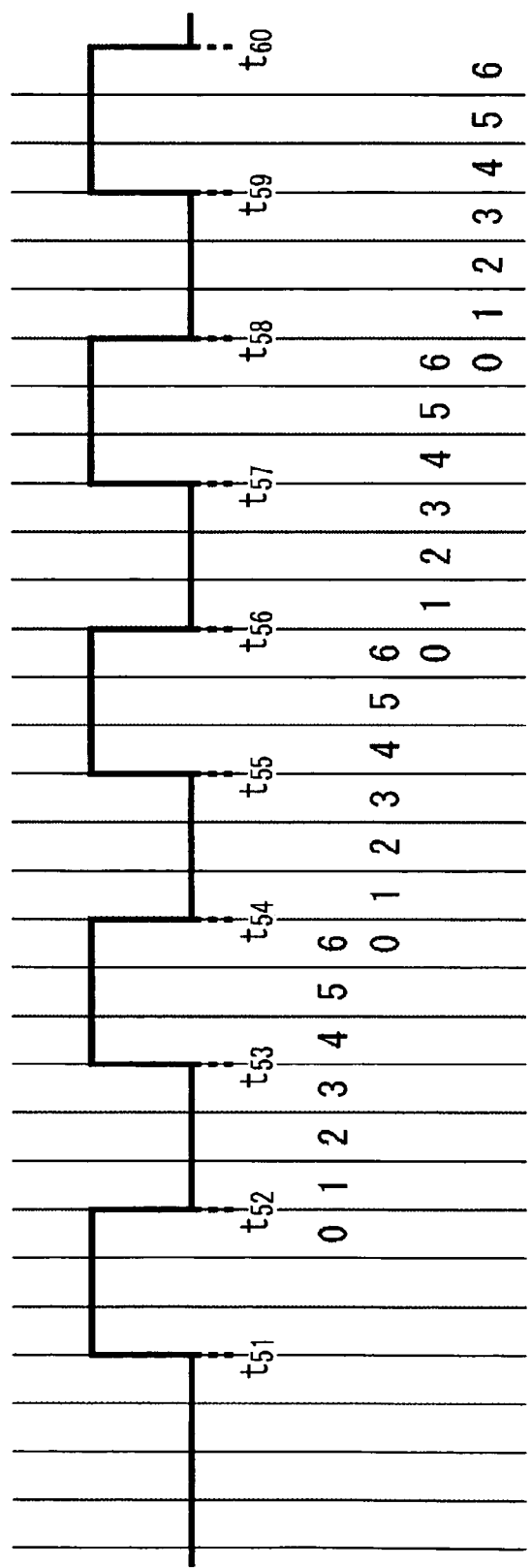
FIG. 13 is a view showing the surveillance processing performed by the surveillance apparatus shown in FIG. 6.

In step S41, the determination section 125 determines whether negative inter-four-frame differences F have been detected in three consecutive frames. The determination section 125 repeats the process until negative inter-four-frame differences F have been detected in three consecutive frames (the results of signal processing indicate the high level in three consecutive frames). When it is determined that negative inter-four-frame differences F(N) have been detected in three consecutive frames, the determination section 125 initializes a built-in frame counter FC to zero in step S42. More specifically, when the results of inter-four-frame difference calculation are obtained as shown in FIG. 13, for example, the high level is detected in three consecutive frames between time t51 and time t52. In other words, when negative inter-four-frame differences F are obtained in three consecutive frames, the frame counter FC is initialized to zero in order to set the start-position frame number to the frame number detected last.

Referring back to FIG. 11, the respective flowchart will be described again.

In step S22, the determination section 125 waits for the inter-four-frame difference F for the frame one frame after to be input. In step S23, the determination section 125 increments the frame counter FC by one. In step S24, the determination section 125 determines whether the frame counter FC indicates four or five. When one of the two frames immediately after time t53 in FIG. 13 is handled (in other words, when the frame counter FC indicates four or five), the processing proceeds to step S25.

In step S25, it is determined whether a negative inter-four-frame difference F has been detected. In the case shown in FIG. 13, for example, since the high level is output at the frame having a frame number of four or five, it is determined that a negative inter-four-frame difference F has been obtained. The determination section 125 determines in step S29 that nothing occurred. The processing returns step S22.

When a negative inter-four-frame difference F is not obtained in step S25, whereby a high-level output which should be obtained as shown in FIG. 13 is not acquired, the determination section 125 determines in step S30 that something occurred.

When the frame counter FC does not indicate four or five in step S24, the determination section 125 determines in step S26 whether the frame counter FC indicates six. When the current frame is the frame immediately before time t54 shown in FIG. 13, having a frame number of six, the determination section 125 determines in step S27 whether a negative inter-four-frame difference F has been obtained. Since the inter-four-frame difference F is negative in the frame having a frame number of six as shown in FIG. 13, the determination section 125 resets the frame counter FC to zero in step S28, and the processing proceeds to step S29.

When it is determined in step S27 that a negative inter-four-frame difference F is not obtained, the processing proceeds to step S30, and the determination section 125 determines that something occurred.

When it is determined in step S26 that the frame counter FC does not indicate six, whereby the frame counter FC does not indicate four or five in step S24, does not indicate six in step S26 and, therefore, it is determined that the frame counter FC indicates one, two or three, the processing proceeds to step S29.

In other words, when the frame counter FC, indicated at the bottom of FIG. 13, is four, five, or six, if it is continuously determined that the corresponding inter-four-frame difference F is negative, it is determined that nothing occurred.

Referring back to the flowchart of FIG. 10, the processing will be described.

In step S5, the determination section 125 determines whether the result of determination processing shows that something occurred. When it is determined that something occurred, for example, the surveillance processing proceeds to step S6.

In step S6, the determination section 125 displays the result of determination indicating that something occurred in the display section 126. In step S7, the determination section 125 stores the result of determination indicating that something occurred in the external storage section. Further, in step S8, the determination section 125 controls the communication section 128 to send the result of determination indicating that something occurred to other information processing apparatuses, such as a server managing the surveillance apparatus and a portable terminal of the owner of the surveillance apparatus, through an external network.

In step S9, the determination section outputs information indicating that something occurred to the control section 122, and makes the operating state idle according to the information.

In step S10, the control section 122 determines whether the idling state has been released. The control section 122 maintains the idling state until it is released. When it is determined that the idling state is released, the processing returns to step S2 and the subsequent processes are repeated.

With the above-described processing, an invader (including an invading object) can be detected without being affected by a change in brightness at the surveillance area 103 specified between the surveillance apparatus 101 and the reflecting object 102. In addition, when an area where the floodlight section 111 projects light is extended to extend an area where the image capturing section 112 captures images, the surveillance area can be extended.

In the above embodiment, the surveillance apparatus 101 has the floodlight section 111 and the image-capturing section 112. It is also possible, for example, that a floodlight section is provided separately from the surveillance apparatus 101, and the image capturing section of the surveillance apparatus captures light emitted from the floodlight section and reflected from the reflecting object 102.

Figure 14:
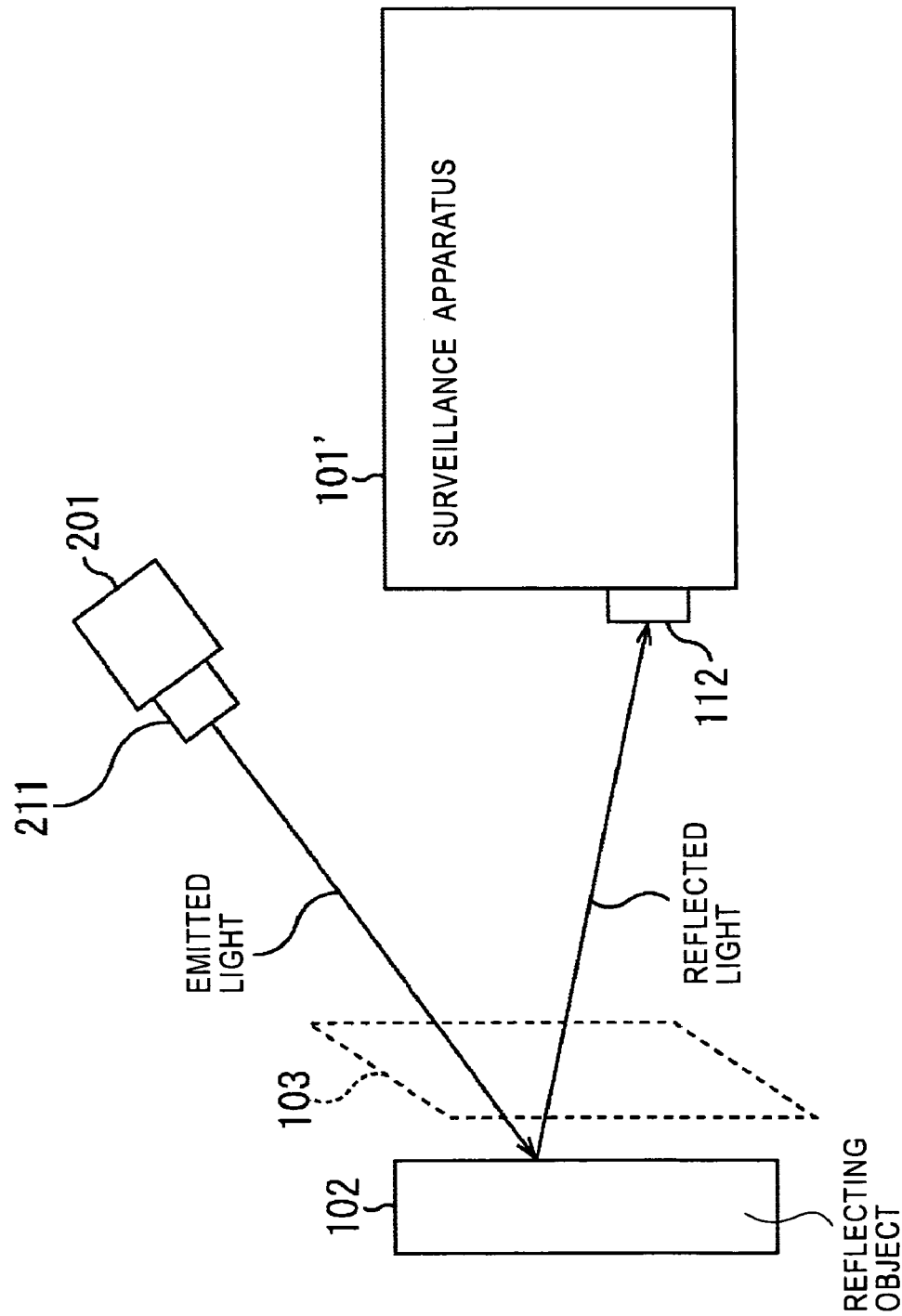
FIG. 14 is a view showing the structure of a surveillance system according to another embodiment of the present invention.

FIG. 14 shows the structure of a surveillance system in which a floodlight section is provided separately from a surveillance apparatus.

A surveillance apparatus 101' basically has a structure in which the floodlight section 111 is removed from the surveillance apparatus 101. The floodlight section 211 of a floodlight apparatus 201 has the same structure as the floodlight section 111 of the surveillance apparatus 101, and emits light toward a surveillance area 103 from a location different from that of the surveillance apparatus 101'. The surveillance apparatus 101' captures reflected light emitted from the floodlight section 211 and reflected by an invading object 102, by using an image capturing section 112, and detects an invader in a surveillance area 103.

The structure of the surveillance apparatus 101' will be described next with reference to FIG. 15. Since the surveillance apparatus 101' basically has the same structure as the surveillance apparatus 101, the same symbols as those used in the surveillance apparatus 101 are assigned to sections having the same functions as those of the surveillance apparatus 101. A description thereof is omitted, if unnecessary.

The surveillance apparatus 101' differs from the surveillance apparatus 101 in that an image capturing unit 221 and a determination section 125' are provided instead of the image capturing section 112, the internal storage section 123, the signal processing section 124, and the determination section 125, and the floodlight section 111 is not provided. The image capturing unit 221 is formed by integrating an image capturing section 112', an internal storage section 123', and a signal processing section 124' which have the same functions and the image capturing section 112, the internal storage section 123, and the signal processing section 124, respectively. Since the image capturing unit 221 can extend the bandwidth of data transfer, the transfer rate of the result of capturing sent from the image capturing section 112' to the internal storage section 123' and the transfer rate of stored signals sent from the internal storage section 123' to the signal processing section 124' are improved as compared with those of the surveillance apparatus 101. The other functions are the same. Therefore, instead of the image capturing unit 221, the image capturing section 112, the internal storage section 123, and the signal processing section 124 may be provided.

The determination section 125' basically has the same functions as the determination section 125, but performs processing for absorbing a shift of control clock, caused because the floodlight section 211 is provided separately from the surveillance apparatus 101'. Determination processing executed by the determination section 125' will be described later in more detail.

Figure 16:
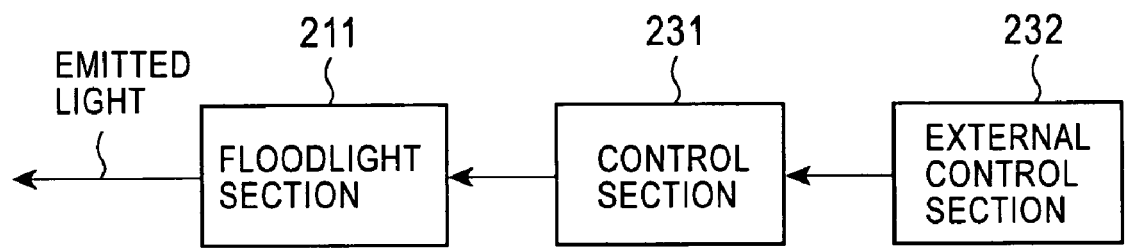
FIG. 16 is a block diagram showing the structure of a floodlight apparatus shown in FIG. 14.

The structure of the floodlight apparatus 201 will be described next with reference to FIG. 16. The floodlight section 211 is basically the same as the floodlight section 111 shown in FIG. 6, is controlled by a control section 231, and emits light having a predetermined pattern to the surveillance area 103.

The control section 231 and an external control section 232 have the same functions as the control section 122 and the external control section 129 shown in FIG. 6.

Since the floodlight apparatus 201 is provided separately from the surveillance apparatus 101', when the surveillance apparatus 101' captures reflected light emitted from the floodlight section 211 and reflected by the reflecting object 102 and performs signal processing, synchronization may be not obtained, and thereby a detected waveform is changed. To overcome this issue, the determination section 125' executes determination processing different from that of the determination section 125 as described later.

Figure 17:
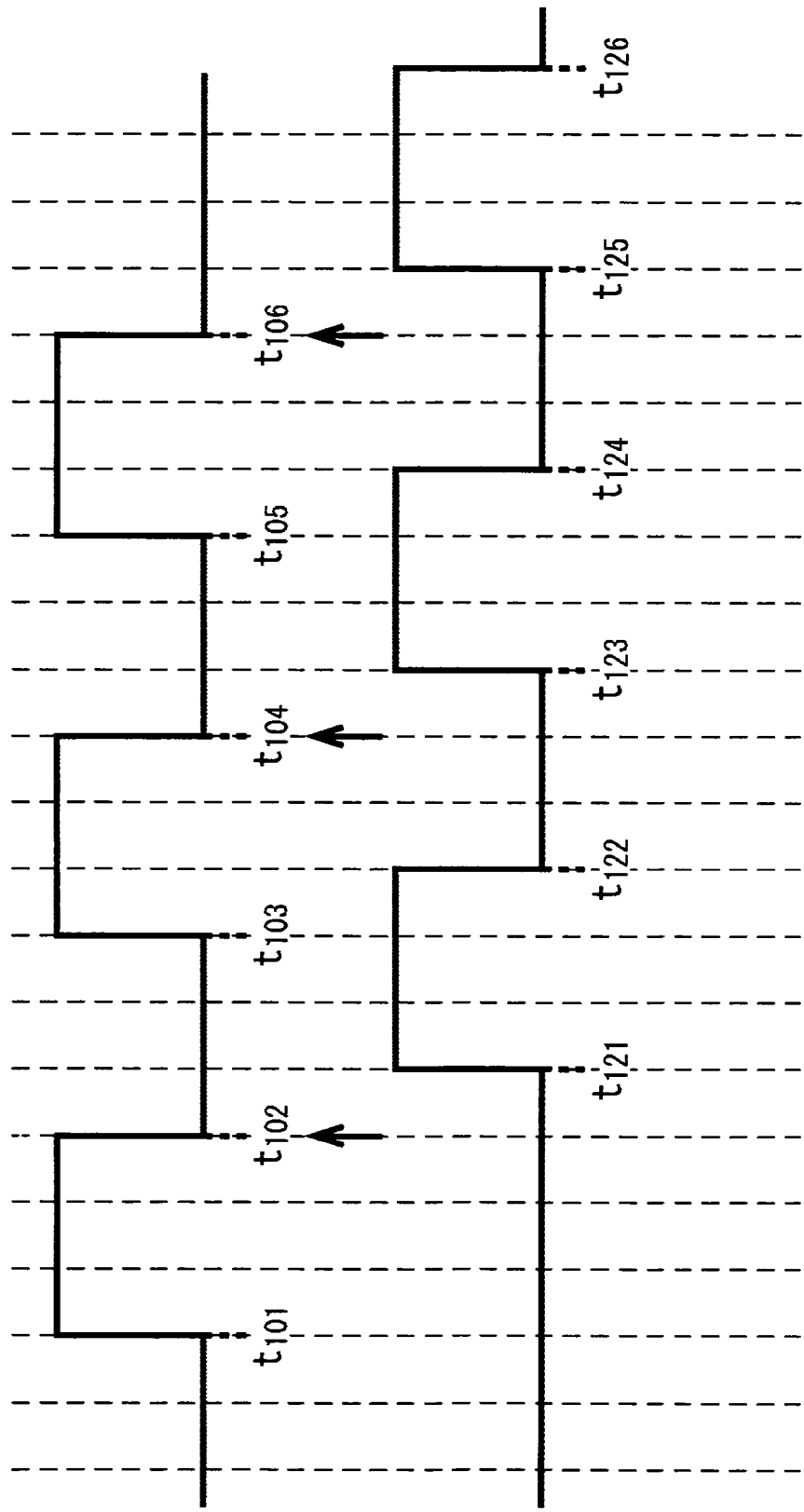
FIG. 17 is a view showing determination processing performed by the surveillance apparatus shown in FIG. 15.

When a control clock generated by the control section 231 of the floodlight section 201 is synchronized with a control clock generated by the control section 122, if the floodlight section 211 emits a signal having a high level from time t101 to t102, from time t103 to t104, and from time t105 to t106 as a pattern shown at the top row of FIG. 17, it is assumed that the signal processing section 124' of the surveillance section 101' outputs a signal having the high level from time t121 to t122, from time t123 to t124, and from time t125 to t126 where negative inter-four-frame differences F are obtained and which are later than time t102, as shown at the bottom row of FIG. 17. This occurs because a time difference occurs between the time when the floodlight section 211 emits light and the time when the image capturing unit 221 performs processing.

Therefore, as shown in FIG. 17, it is understood that a rising edge is detected at an interval of six frames in a light projecting pattern, and a rising edge is also detected at an interval of six frames in the inter-four-frame difference F. In other words, if it is checked that the inter-four-frame difference F becomes high at an interval of six frames, it is an indication that there is no invader.

When the control clock generated by the control section 231 is not synchronized with the control clock generated by the control section 122, and either of their frequencies is not correctly a multiple of the others, the timing when the inter-four-frame difference F becomes high at an interval of a predetermined number of frames may come earlier or later by one frame.

Figure 18:
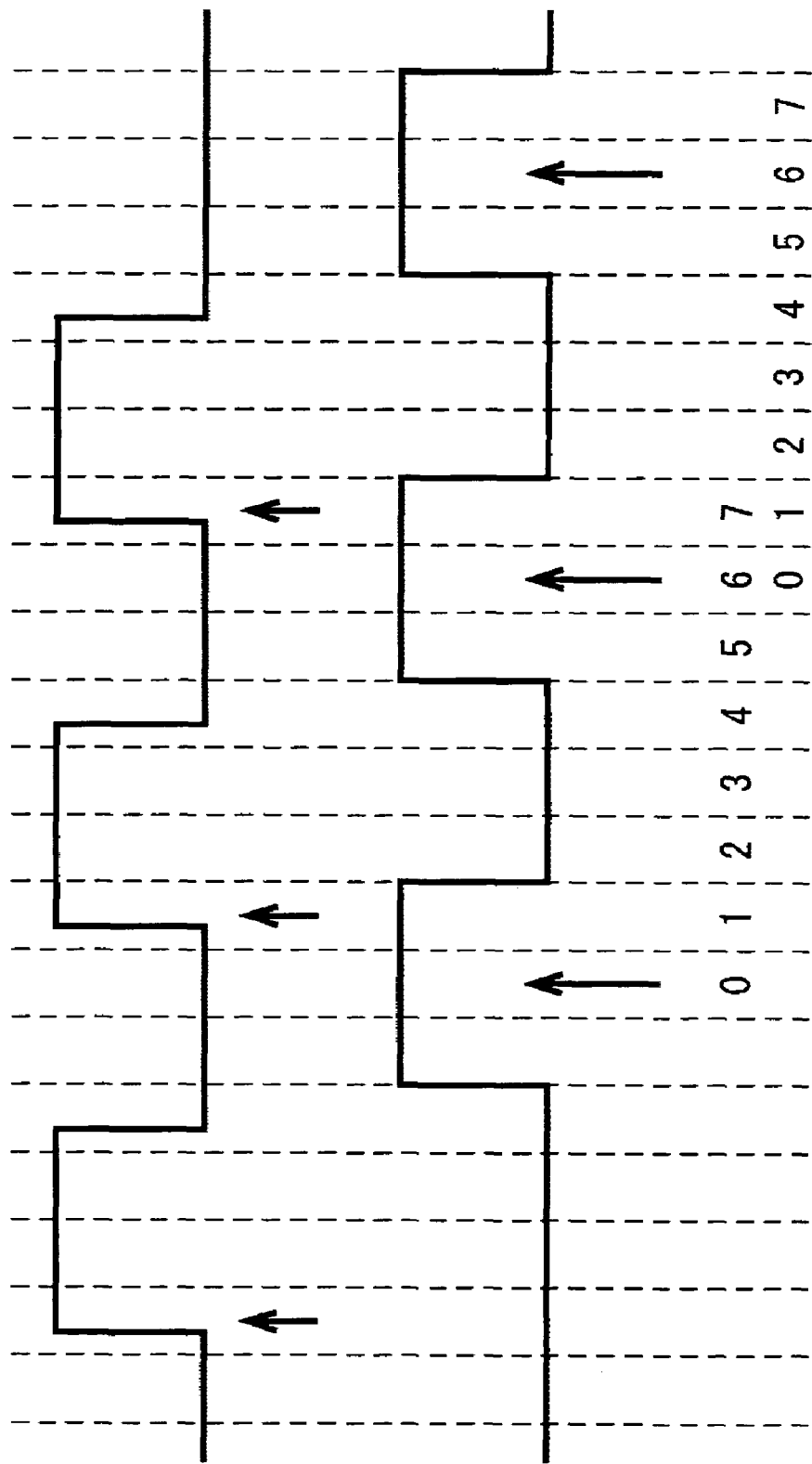
FIG. 18 is a further view showing the determination processing performed by the surveillance apparatus shown in FIG. 15.

Therefore, as shown at the bottom row of FIG. 18, the determination section 125' resets the frame counter FC to zero at the second frame from when the result of signal processing (the inter-four-frame difference) becomes high, and determines where there is an invader by checking if the result of signal processing becomes high at the sixth frame when the frame counter is reset. With this, when the floodlight section 211 emits light as shown at the top row of FIG. 19, for example, if the timing of the second frame in three frames where the result of signal processing has the high level for the first time is used as a reference, the result of signal processing should also have the high level from the fifth frame to the seventh frame next time.

If clock synchronization is not obtained, and either of the frequencies of the clock signals is not correctly a multiple of the others, however, when the result of signal processing has the high level one frame earlier, for example, the result of signal processing has the high level from the fourth frame to the sixth frame (between A and A' at the bottom row of FIG. 19) counting from the frame where the frame counter FC was set to zero. The frame counter FC is set to zero at the fifth frame and, counting from this frame, the result of signal processing should have the high level from the fifth frame to the seventh frame next time. In contrast, when the result of signal processing has the high level one frame later, the result of signal processing has the high level from the sixth frame to the eighth frame (between B and B' at the bottom row of FIG. 19) counting from the frame where the frame counter FC was set to zero. The frame counter FC is set to zero at the seventh frame, and counting from this frame, the result of signal processing should become the high level at the sixth frame next time.

The determination section 125' determines whether the result of signal processing has the high level from the fourth frame to the sixth frame counting from the frame where the frame counter FC was set to zero. In addition, when the high level continues for two frames, the determination section 125' sets the frame counter FC to zero. This process is repeated. As a result, when the result of signal processing always has the high level for three consecutive frames, the frame counter FC is always set to zero at the center frame thereof. Therefore, a shift of frames where the result of signal processing has the high level can be compensated for.

Figure 20:
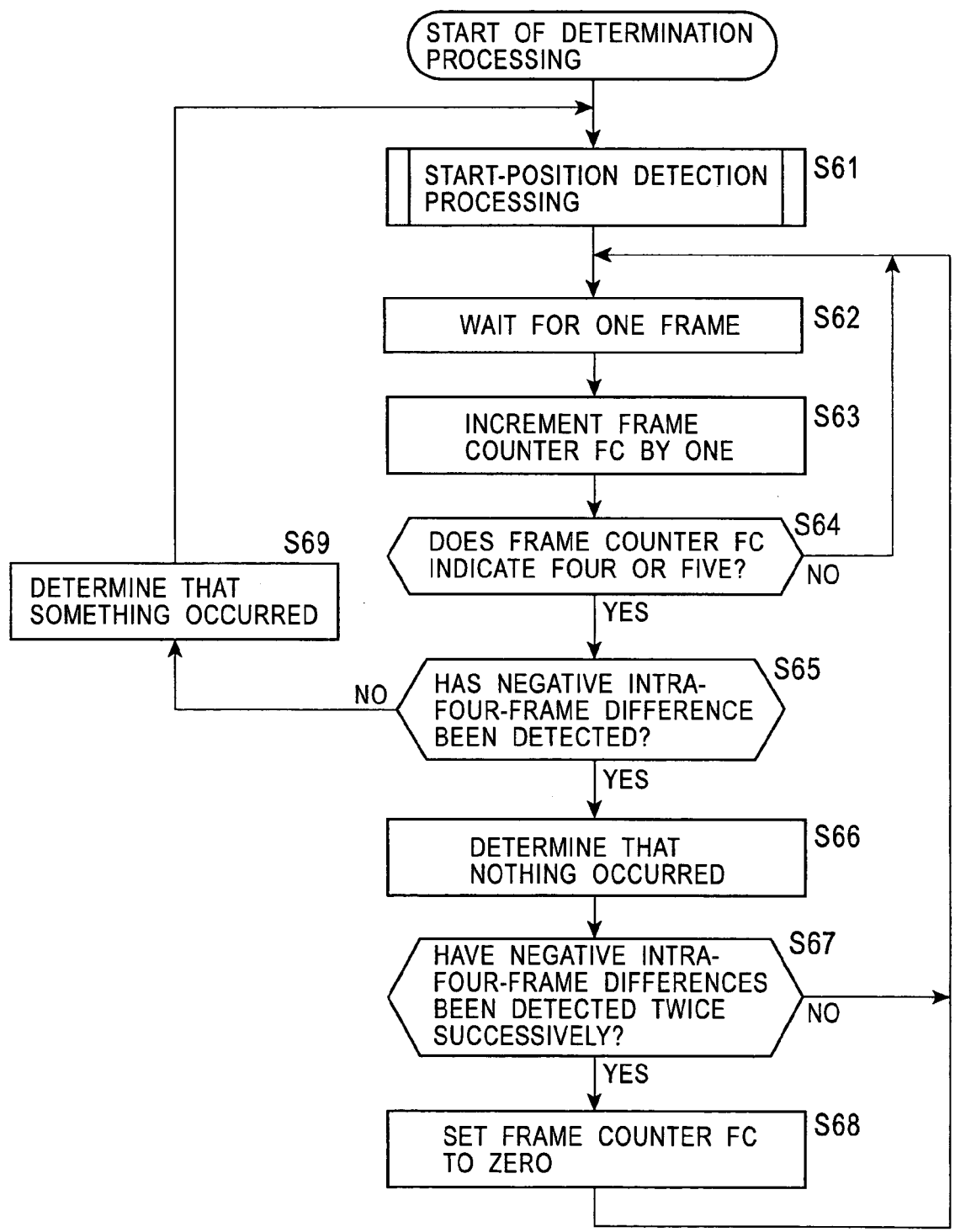
FIG. 20 is a flowchart showing the determination processing performed by the surveillance apparatus shown in FIG. 15.

The determination processing performed in the structure shown in FIG. 14 will be described below with reference to a flowchart shown in FIG. 20. Since surveillance processing is the same as that shown in FIG. 10, a description thereof is omitted.

In step S61, the determination section 125' executes start-position detection processing.

Figure 21:
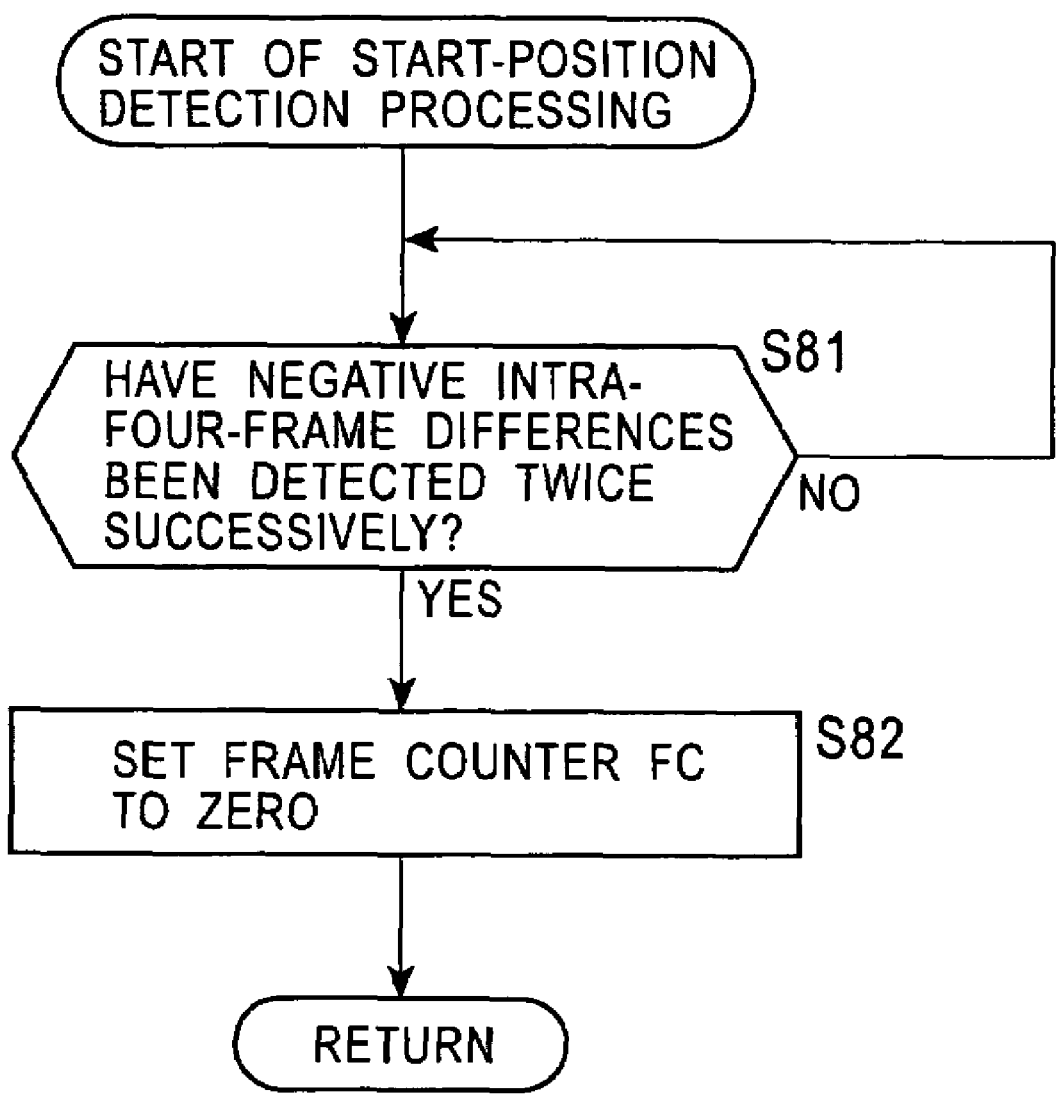
FIG. 21 is a flowchart showing start-position detection processing performed by a determination section shown in FIG. 15.

The start-position detection processing will be described with reference to a flowchart shown in FIG. 21.

In step S81, the determination section 125' determines whether negative inter-four-frame differences F have been detected in two consecutive frames. The determination section 125' repeats the process until negative inter-four-frame differences F have been detected in two consecutive frames (the results of signal processing indicate the high level in two consecutive frames). When it is determined that negative inter-four-frame differences F(N) have been detected in two consecutive frames, the determination section 125' initializes a built-in frame counter FC to zero in step S82.

Referring back to FIG. 20, the flowchart will be described again.

In step S62, the determination section 125' waits for processing for one frame. When the result of signal processing for the next one frame is input, the determination section 125 increments the frame counter FC by one in step S63. In step S64, the determination section 125' determines whether the frame counter FC indicates four, five, six, or seven. When the frame counter FC indicates one, two, or three, the processing returns to step S62. When the frame counter FC indicates one, two, or three, wherein the current frame is one of the first to third frames where the result of signal processing has the low level, counting from the frame where the frame counter FC was set to zero, there is no determination made regarding the presence of an invader.

When the frame counter FC indicates four, five, six, or seven in step S64, the determination section 125' determines in step S65 whether a negative inter-four-frame difference F has been detected. When it is determined in step S65 that a negative inter-four-frame difference F has been detected, for example, the determination section 125' determines in step S66 that nothing occurred. More specifically, the fact that a negative inter-four-frame difference F has been detected when the frame counter FC indicates four, five, six, or seven refers to the result of signal processing having the high level, and the image capturing section 112' having captured an optical signal emitted from the floodlight section 211 and reflected by the reflecting object 102. As a result, it is determined that there is no invader.

In step S67, the determination section 125' determines whether negative inter-four-frame difference F have been detected in two consecutive frames. When the determination section 125' determines that negative inter-four-frame difference F have been detected in two consecutive frames, for example, the determination section 125' sets the frame counter FC to zero in step S68, and the processing returns to step S62.

When a negative inter-four-frame difference F is not obtained in step S65, the determination section 125' determines in step S69 that something occurred; that is, an invader was detected.

Figure 19:
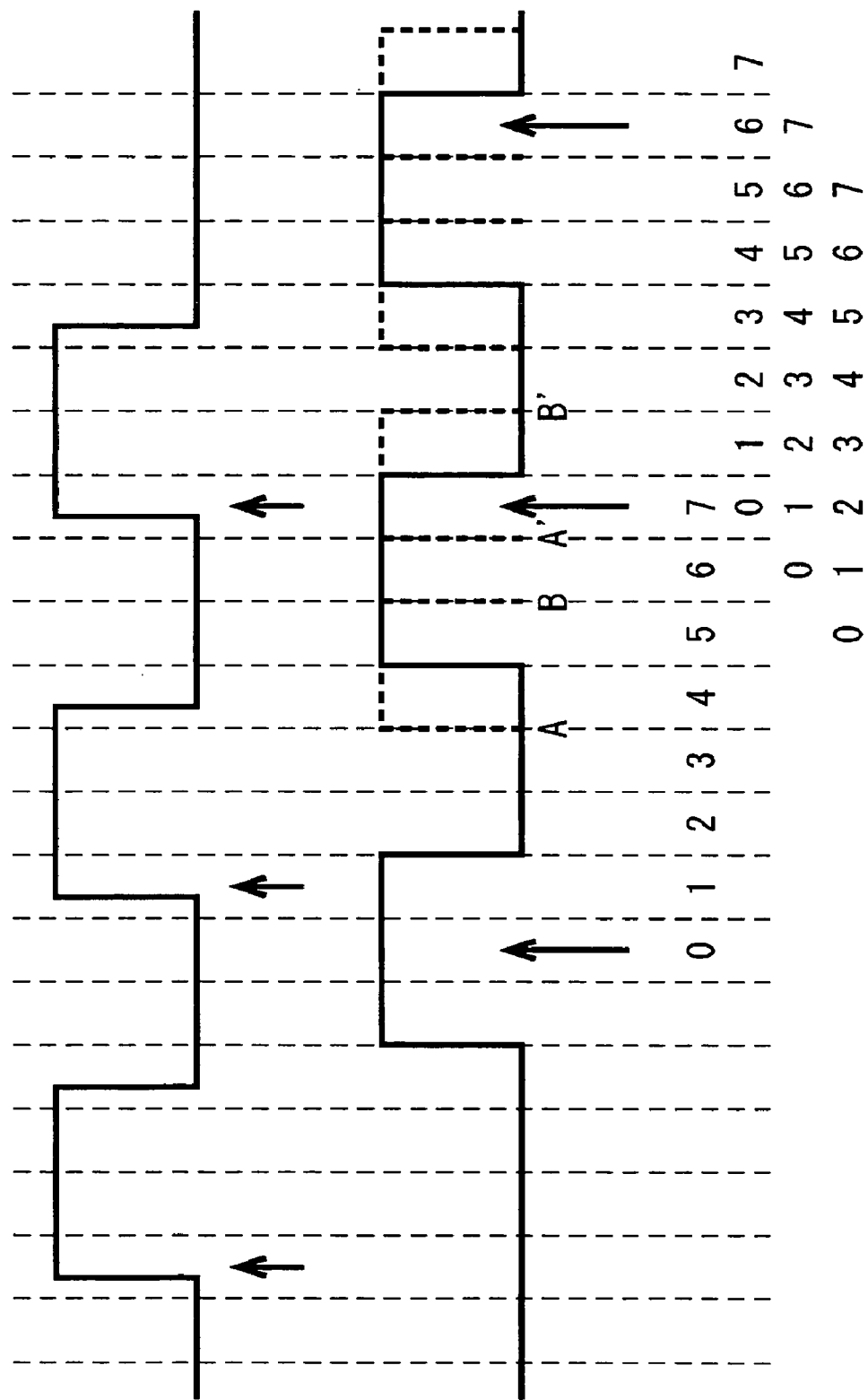
FIG. 19 is a further view showing the determination processing performed by the surveillance apparatus shown in FIG. 15.

When negative inter-four-frame differences F are detected in two consecutive frames, if there is no phase shift as indicated by a solid line at the bottom row of FIG. 19, a negative inter-four-frame difference F is detected for the second time at the sixth frame counting from the frame where the frame counter FC was set to zero, and at the same time, the frame counter FC is reset to zero. If the result of signal processing comes earlier by one frame, a negative inter-four-frame difference F is detected for the second time at the fifth frame counting from the frame where the frame counter FC was set to zero, and at the same time, the frame counter FC is reset to zero. If the result of signal processing comes later by one frame, a negative inter-four-frame difference F is detected for the second time at the seventh frame counting from the frame where the frame counter FC was set to zero, and at the same time, the frame counter FC is reset to zero.

Even if the result of signal processing is shifted by one frame in this way, since the timing where the frame counter FC is reset to zero can be adjusted in response to the shift, a subsequent shift in the inter-four-frame difference F is absorbed. As a result, even when the floodlight apparatus 201 and the surveillance apparatus 101' are separately provided as shown in FIG. 14, and they are controlled by different clock signals, an invader can be detected without erroneous operations.

In the above description, the inter-four-frame difference is calculated in the signal processing. The number of frames used for calculation may be larger than four. When six frames are used, $F(N)=\{F(N)+F(N-1)+F(N-2)\}-\{F(N-3)+F(N-4)+F(N-5)\}$. In the above description, the result of signal processing has the high level or the low level according to the sign of the inter-four-frame difference F. In other words, the inter-four-frame difference F is compared with a threshold of zero to determine the level of the result of signal processing. Another threshold may be used.

As described above, since, unlike the conventional technology, the surveillance processing according to the present invention does not use a comparison with a reference image, it is not necessary to update the reference image according to a change in the brightness in a surveillance area, and an erroneous operation caused by a change in brightness is prevented. Therefore, an area where light is projected by a floodlight section can be extended, and an area where the corresponding image capturing section can capture images may be extended to widen the surveillance area.

The above-described series of processes can be implemented not only by hardware but also by software. When the series of processes is achieved by software, a program constituting the software is installed from recording media into a computer in which special hardware is incorporated, or into a unit which can execute various functions by installing various programs, such as a general-purpose personal computer.

Figure 15:
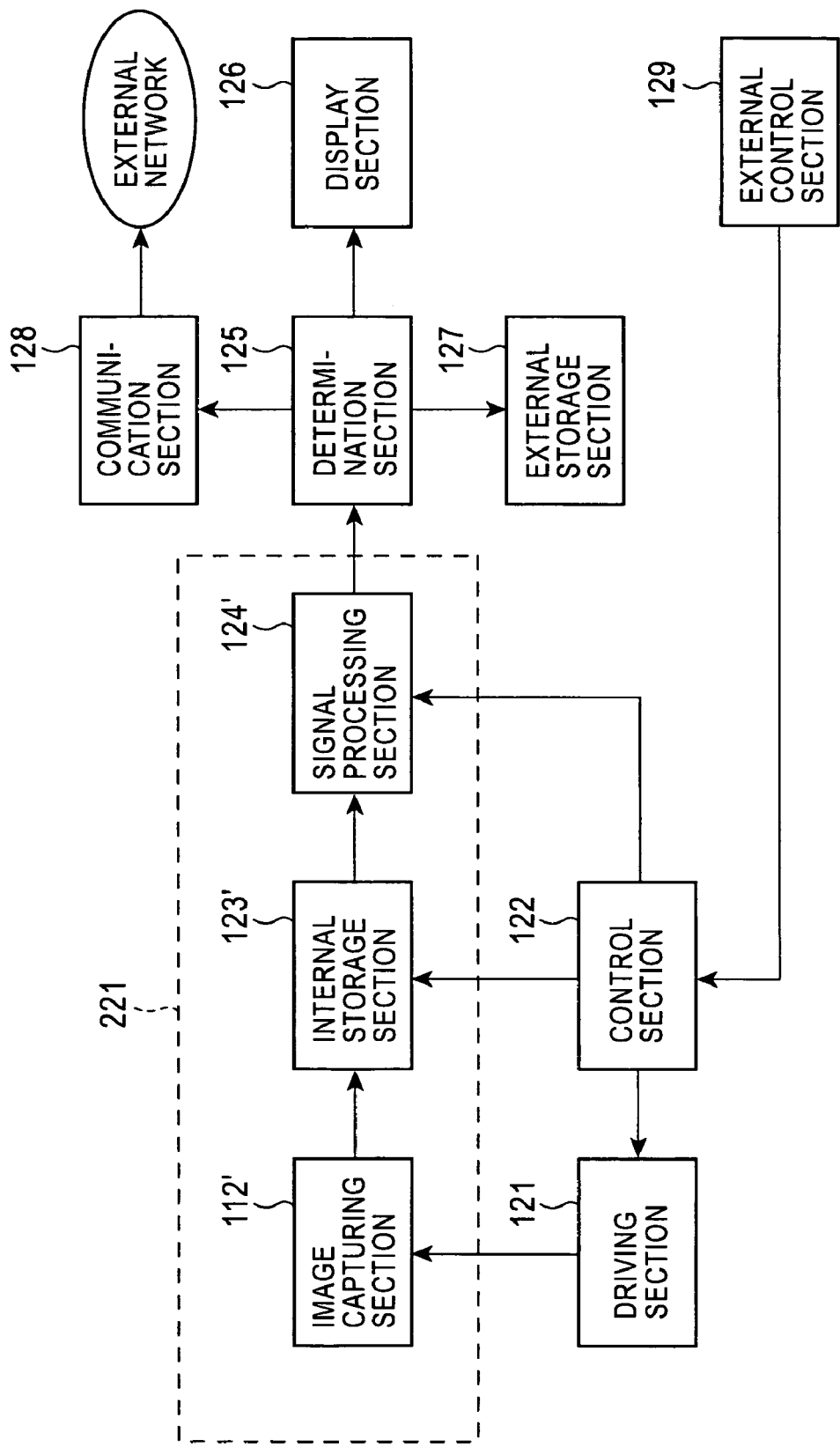
FIG. 15 is a block diagram showing the structure of a surveillance apparatus shown in FIG. 14.
Figure 22:
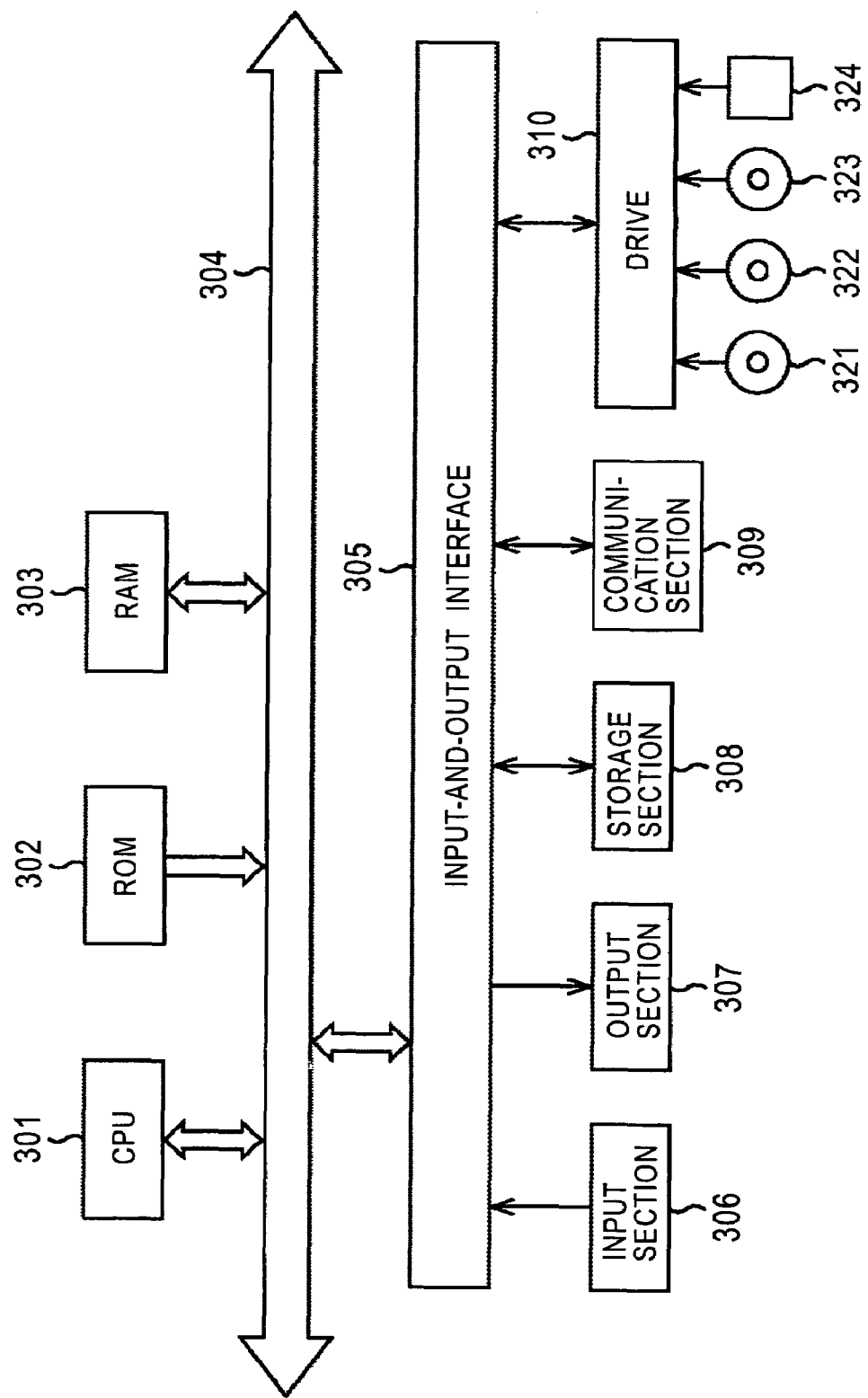
FIG. 22 is a view showing recording media.

FIG. 22 shows the structure of a personal computer according to one embodiment of the present invention, used to implement the surveillance apparatus 101 shown in FIG. 6 or the surveillance apparatus 101' shown in FIG. 15 by software. A CPU 301 in the personal computer controls the operation of the entire personal computer. When an instruction is input from an input section 306 formed of a keyboard and a mouse through a bus 304 and an input-and-output interface 305 by the user, the CPU 301 executes the corresponding program stored in a read-only memory (ROM) 302. Alternatively, the CPU 301 loads the corresponding program read from a magnetic disk 321, an optical disk 322, a magneto-optical disk 323, or a semiconductor memory 324 connected to a drive 310 and installed into a storage section 328, to a random-access memory (RAM) 323 and executes it. Further, the CPU 301 controls a communication section 309 to communicate with the outside to transmit and receive data.

As shown in FIG. 22, the recording media which record the program include not only package media storing the program and distributed separately from the computer to provide the program for the users, such as the magnetic disk 321 (including a floppy disk), the optical disk 322 (including a compact disk read only memory (CD-ROM) and a digital versatile disk (DVD)), the magneto-optical disk 323 (including a Mini-Disc (MD)), and the semiconductor memory 324, but also units which are incorporated in advance in the computer and provided for the users, such as the ROM 302 which have recorded the program and a hard disk included in a storage section 308.

In the present application, steps describing the program recorded in a recording medium include not only processing executed in a time-sequential manner in the described order, but also processing which is not necessarily executed in a time-sequential manner but is processed in parallel or separately.

Also in the present application, a system refers to the entire apparatus formed of a plurality of units.

Although the present invention has been described with reference to specific embodiments, those of skill in the art will recognize that changes may be made thereto without departing from the spirit and scope of the present invention as set forth in the hereafter appended claims.

The invention claimed is:

1. An image processing apparatus, comprising:
   a reflector for reflecting emitted light changing with a predetermined pattern;

an image capturing device for capturing an image of the reflected light reflected by the reflector;

a difference calculator for calculating a difference, among 2N consecutive frames, between a sum in recent N frames and a sum in other N frames for each pixel of the image of the reflected light, captured by the image capturing device, wherein N is 2 or more;

a comparator for comparing the difference calculated by the difference calculator, with a predetermined threshold;

a signal processor for outputting one of a first signal and a second signal depending on a result of the comparison performed by the comparator;

a determination device for determining at a predetermined interval whether the signal output from the signal processor is a predetermined signal; and a detector for detecting an invader or object according to a result of the determination performed by the determination device.

2. An image processing apparatus as claimed in claim 1, further comprising a floodlight for emitting the emitted light changing with the predetermined pattern.

3. An image processing apparatus as claimed in claim 1, wherein a period of the emitted light changing with the predetermined pattern is equal to a period of time of three frames in the image capturing device.

4. An image processing apparatus as claimed in claim 3, wherein the determination device determines at an interval of six frames whether the signal output from the signal processor is a high-level signal.

5. An image processing apparatus as claimed in claim 3, wherein the determination device changes the interval at which the determination device determines whether the signal output from the signal processor is a high-level signal to any of five frames, six frames, and seven frames.

6. A method for image processing, the method comprising the steps of:

reflecting emitted light changing with a predetermined pattern;

capturing an image of the reflected light which was reflected in the step of reflecting;

calculating a difference among 2N consecutive frames, between a sum in recent N frames and a sum in other N frames for each pixel of the image of the reflected light which was captured in the step of capturing, wherein N is 2 or more;

comparing the difference calculated in the step of calculating with a predetermined threshold;

outputting one of a first signal and a second signal depending on a result of the comparison performed in the step of comparing;

determining at a predetermined interval whether the signal output in the step of outputting is a predetermined signal; and detecting an invader according to a result of the step of determining.

7. A computer readable program product recorded on a computer-readable recording medium, the computer readable program product comprising:

a difference calculation step of calculating a difference, among 2N consecutive frames, between a sum in recent N frames and a sum in other N frames for each pixel of a captured image of reflected light, wherein N is 2 or more;

a comparison step of comparing the difference calculated in the difference calculation step with a predetermined threshold;

a signal processing step of outputting one of a first signal and a second signal depending on a result of the comparison performed in the comparison step;

a determination step of determining at a predetermined interval whether the signal output in the signal processing step is a predetermined signal; and a detection step of detecting an invader according to a result of the determination performed in the determination step.

8. A process of computer executed processing based on a computer readable program recorded on a computer-readable medium, the process comprising:

a difference calculation step of calculating a difference, among 2N consecutive frames, between a sum in recent N frames and a sum in other N frames for each pixel of a captured image of reflected light, wherein N is 2 or more;

a comparison step of comparing the difference calculated in the difference calculation step with a predetermined threshold;

a signal processing step of outputting one of a first signal and a second signal depending on a result of the comparison performed in the comparison step;

a determination step of determining at a predetermined interval whether the signal output in the signal processing step is a predetermined signal; and a detection step of detecting an invader according to a result of the determination performed in the determination step.

* * * * *